(12) United States Patent
Kushmerick et al.

(10) Patent No.: US 10,205,627 B2
(45) Date of Patent: Feb. 12, 2019

(54) METHOD AND SYSTEM FOR CLUSTERING EVENT MESSAGES

(71) Applicant: VMware, Inc., Palo Alto, CA (US)

(72) Inventors: Nicholas Kushmerick, Seattle, WA (US); Junyuan Lin, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 1072 days.

(21) Appl. No.: 14/313,802

(22) Filed: Jun. 24, 2014

(65) Prior Publication Data

US 2015/0372855 A1 Dec. 24, 2015

(51) Int. Cl.
*G06F 15/16* (2006.01)
*H04L 12/24* (2006.01)
*H04L 29/08* (2006.01)
*H04L 29/06* (2006.01)

(52) U.S. Cl.
CPC ........ *H04L 41/0613* (2013.01); *H04L 41/069* (2013.01); *H04L 67/10* (2013.01); *H04L 67/38* (2013.01)

(58) Field of Classification Search
CPC ......... G06F 17/30598; G06F 17/30424; H04L 41/0613; H04L 41/069; H04L 67/10; H04L 67/38; H04L 41/0604; H04L 41/22; H04L 43/028; H04L 67/36
See application file for complete search history.

(56) References Cited

U.S. PATENT DOCUMENTS

| | | |
|---|---|---|
| 6,823,512 B1 | 11/2004 | Miller |
| 7,035,876 B2 | 4/2006 | Kawai |
| 7,647,595 B2 | 1/2010 | Chandrasekaran |
| 8,090,873 B1 | 1/2012 | Wookey |
| 8,719,302 B2 | 5/2014 | Bailey |
| 9,514,414 B1 | 12/2016 | Rosswog |
| 2004/0002958 A1 | 1/2004 | Seshadri et al. |
| 2011/0185234 A1* | 7/2011 | Cohen ................. G06F 11/3476 714/37 |
| 2014/0334739 A1* | 11/2014 | Umanesan .......... G06F 17/3071 382/200 |

* cited by examiner

*Primary Examiner* — Normin Abedin

(57) ABSTRACT

The current document is directed to methods and systems for processing, classifying, and efficiently storing large volumes of event messages generated in modern computing systems. In a disclosed implementation, received event messages are normalized to identify non-parameter tokens within the event messages. The non-parameter event tokens are used to compute a metric for each event message. The metrics are used, in turn, to identify a type-associated cluster to which to assign each received event message. The type-associated clusters are created dynamically as streams of event messages are processed. The type-associated clusters may be dynamically split and merged to refine event-message typing.

17 Claims, 38 Drawing Sheets

1202
1208
1210

2013-12-02T10:44:24.095Z li-qe-esx5.vmware.com Rhttpproxy:
[28959B90 verbose 'Proxy Req 46691'] Connected to
localhost:8307 ——— 1212                         ⟵ 1206

2013-12-02T10:44:24.094Z li-qe-esx5.vmware.com Rhttpproxy:
[FFFC2B90 verbose 'Proxy Req 46691'] new proxy client
TCP (local=127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59

2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'

2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)

2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction

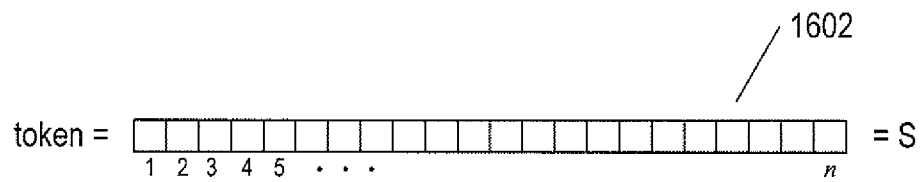
$$A_1 = 1 \oplus S_1$$
$$B_1 = A_1$$
$$A_2 \quad A_1 \oplus S_2$$
$$B_2 \quad B_1 \oplus A_2$$
1604
$$A_3 \quad A_2 \oplus S_3$$
$$B_3 \quad B_2 \oplus A_3$$
$$\vdots$$
$$A_n = A_{n-1} \oplus S_n$$
$$B_n = B_{n-1} \oplus A_n$$
where $x \oplus y = (x + y) \bmod 65521$
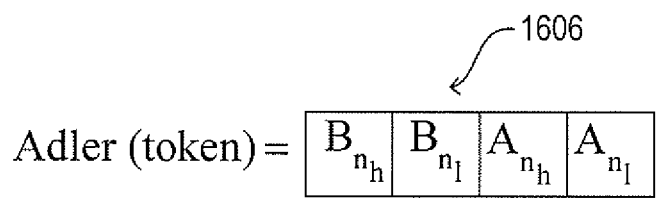
FIG. 16

$$\mathbf{u} = \begin{array}{|c|c|c|c|c|c|c|} \hline u_1 & u_2 & u_3 & u_4 & u_5 & & u_n \\ \hline \end{array}$$

1804

$$\mathbf{v} = \begin{array}{|c|c|c|c|c|c|c|} \hline v_1 & v_2 & v_3 & v_4 & v_5 & & v_n \\ \hline \end{array}$$

1802

$$\mathbf{u} - \mathbf{v} = \begin{array}{|c|c|c|c|c|c|c|} \hline u_1-v_1 & u_2-v_2 & u_3-v_3 & u_4-v_4 & u_5-v_5 & & u_n-v_n \\ \hline \end{array}$$

1806

FIG. 18A $$\mathbf{u} \cdot \mathbf{v} = \begin{array}{|c|} \hline u_1 \\ \hline u_2 \\ \hline u_3 \\ \hline u_4 \\ \hline u_5 \\ \hline \\ \hline u_n \\ \hline \end{array} \times \begin{array}{|c|c|c|c|c|c|c|} \hline v_1 & v_2 & v_3 & v_4 & v_5 & & v_n \\ \hline \end{array} = u_1v_1 + u_2v_2 + u_3v_3 + \ldots u_nv_n$$

1808    1810    1812

FIG. 18B $$f_i(\mathbf{T}) = \overset{\arg\max}{\underset{j}{}} \left( \left[ P_i * \text{Adler}(\mathbf{t}_j) + Q_i \right] \bmod \text{0xffffffff} \right)$$

1904

$\mathbf{T} = (\text{xServer, 36-A-102, NIC, transmission, failure})$ $\begin{cases} h_1 = P_i * \text{Adler}(\text{"xServer"}) + Q_i \\ h_2 = P_i * \text{Adler}(\text{"36-A-102"}) + Q_i \\ h_3 = P_i * \text{Adler}(\text{"NIC"}) + Q_i \\ h_4 = P_i * \text{Adler}(\text{"transmission"}) + Q_i \\ h_5 = P_i * \text{Adler}(\text{"feature"}) + Q_i \end{cases}$

1906

1908 — $f_i(\mathbf{T}) = \overset{\arg\max}{\underset{j}{}} (h_j)$

FIG. 19

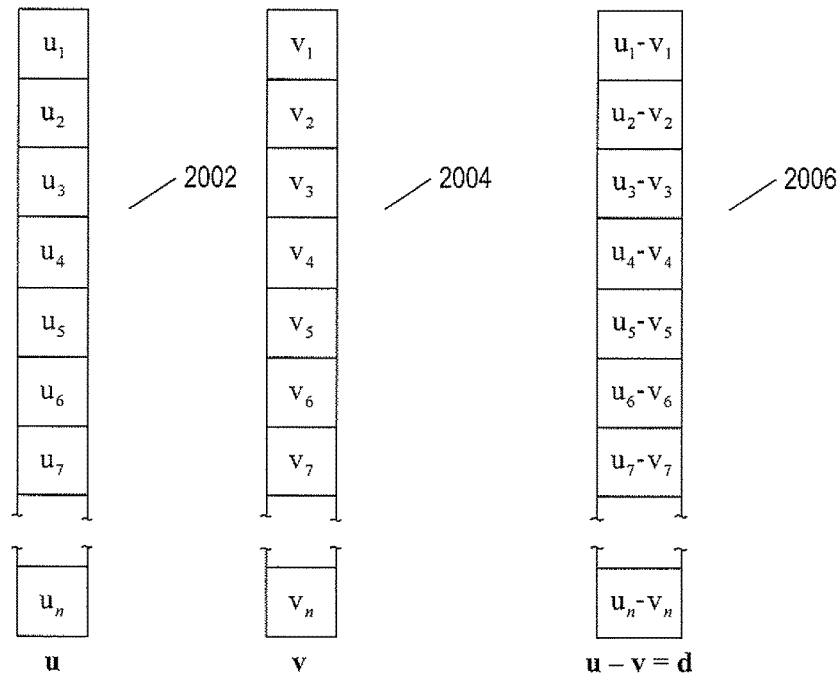
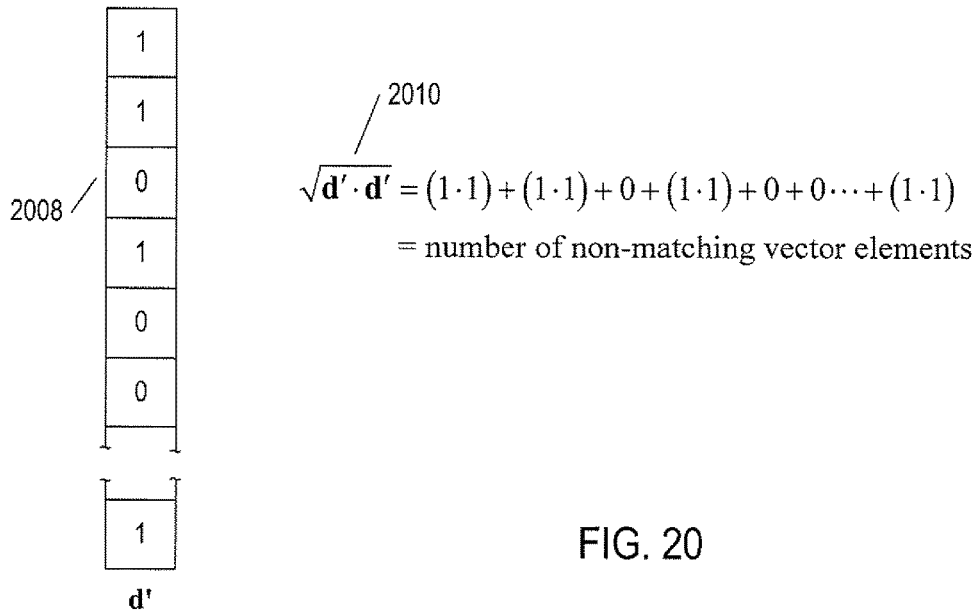
FIG. 20

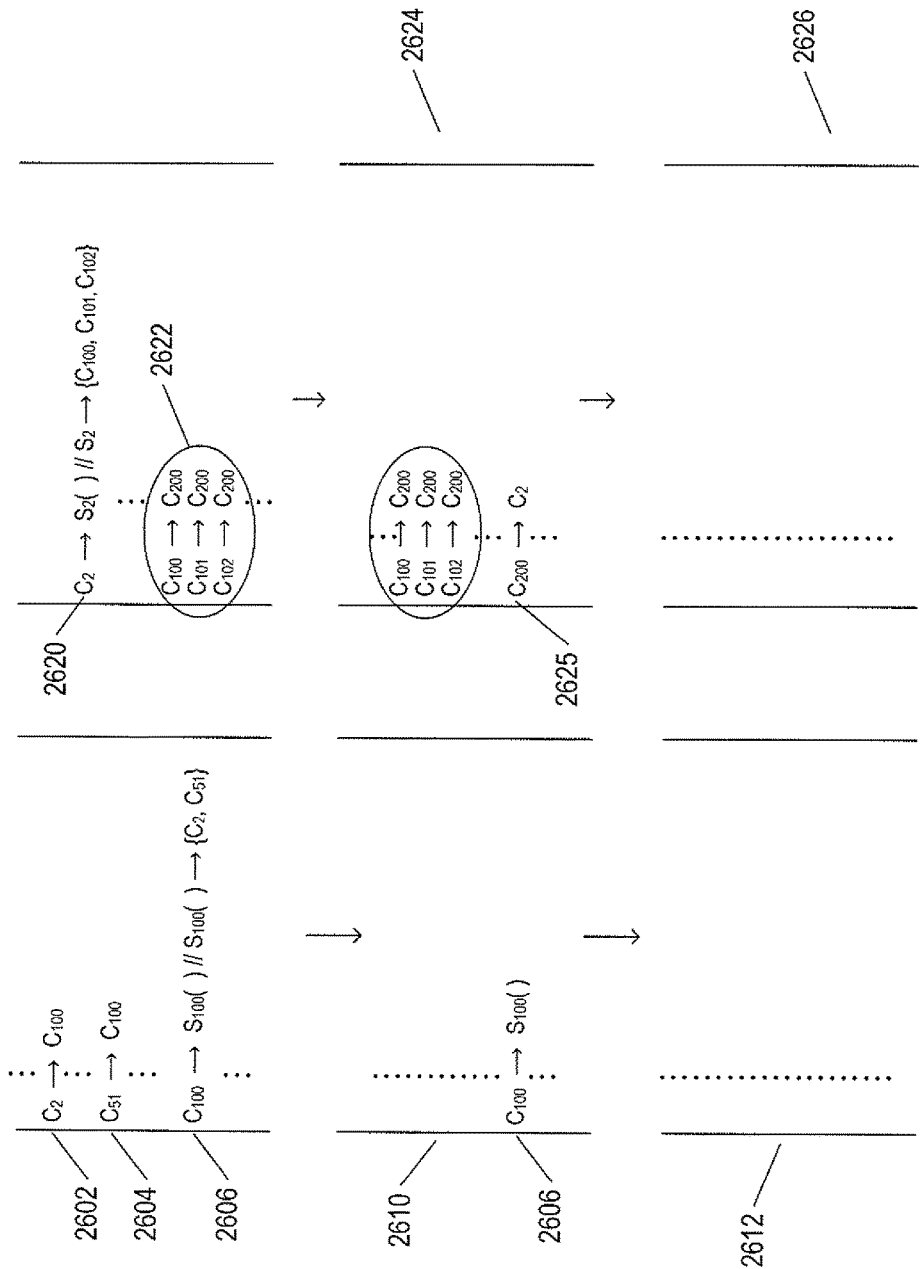

METHOD AND SYSTEM FOR CLUSTERING EVENT MESSAGES

TECHNICAL FIELD

The current document is directed to event logging and event-log interpretation in complex computing systems and, in particular, to methods and systems that process event messages in order to classify each event message as belonging to a particular event-message type and that use event-message-type information for interpreting the contents of event logs and for compactly storing event logs.

BACKGROUND

During the past seven decades, electronic computing has evolved from primitive, vacuum-tube-based computer systems, initially developed during the 1940s, to modern electronic computing systems in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. It has proved to be a challenging task for system administrators, system designers and developers, and system users to identify information within the enormous event logs generated in distributed computing systems relevant to detecting and diagnosing operational anomalies and useful in administering, managing, and maintaining distributed computer systems.

SUMMARY

The current document is directed to methods and systems for processing, classifying, and efficiently storing large volumes of event messages generated in modern computing systems. In a disclosed implementation, received event messages are normalized to identify non-parameter tokens within the event messages. The non-parameter event tokens are used to compute a metric for each event message. The metrics are used, in turn, to identify a type-associated cluster to which to assign each received event message. The type-associated clusters are created dynamically as streams of event messages are processed. The type-associated clusters may be dynamically split and merged to refine event-message typing.

BRIEF DESCRIPTION OF THE DRAWINGS

In FIG. 9, three different physical data centers 902-904 are shown below planes representing the cloud-director layer of abstraction 906-908.

FIG. 12 shows a small, 11-entry portion of a log file from a distributed computer system.

FIGS. 15-20 illustrate one implementation of the logic used by an event-message-clustering system to compute a metric for a received event message that allows the event message to be assigned to a particular existing cluster.

FIGS. 26A-C illustrate examples of editing of the redirection-rule table.

DETAILED DESCRIPTION

Figure 1:
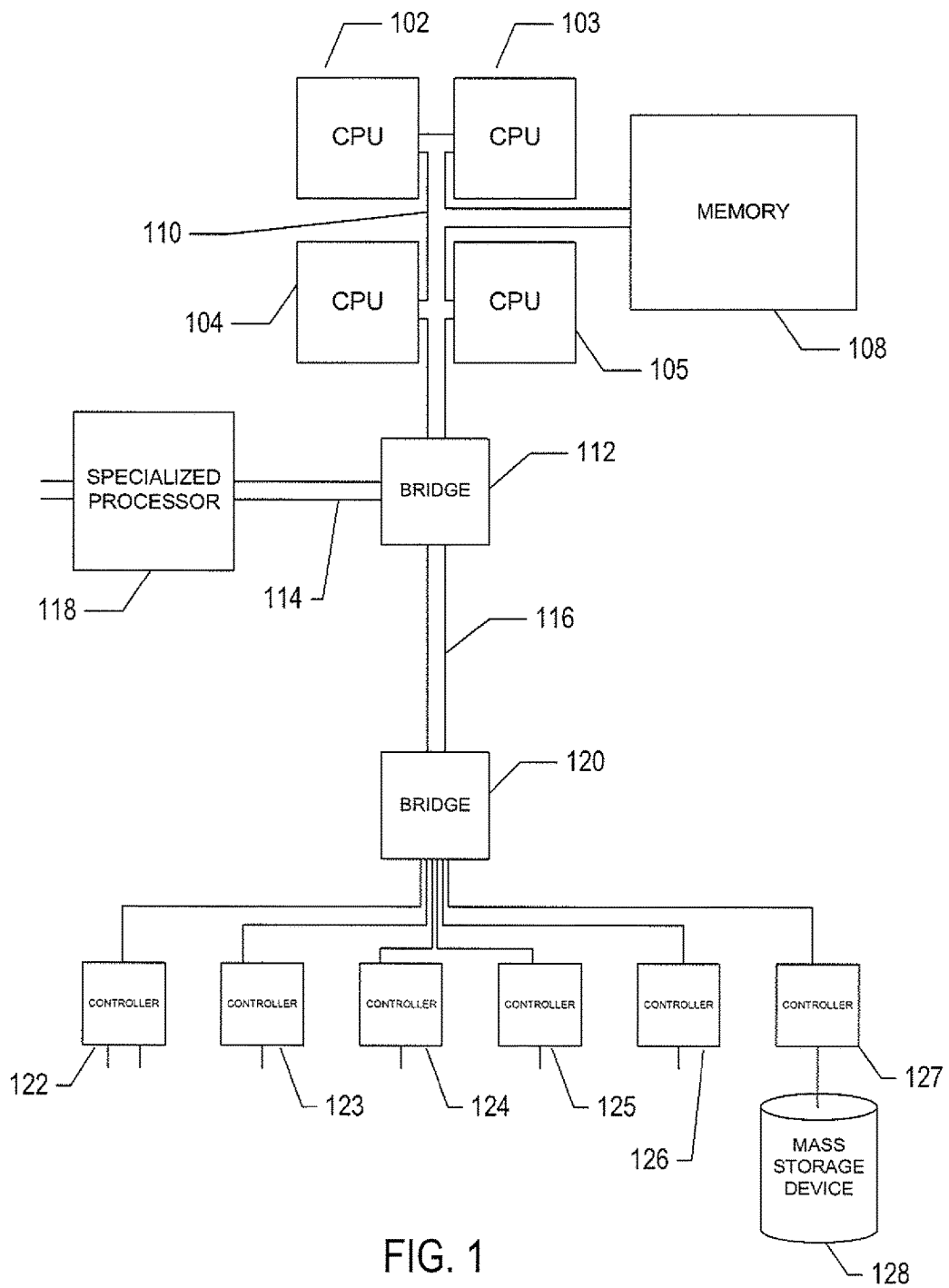
FIG. 1 provides a general architectural diagram for various types of computers.

The current document is directed to methods and systems for processing, classifying, and efficiently storing event messages. In a first subsection, below, a detailed description of computer hardware, complex computational systems, and virtualization is provided with reference to FIGS. 1-10. In a second subsection, implementations of the currently disclosed methods and systems that process, classify, and efficiently store event messages are discussed with reference to FIGS. 11-27G.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
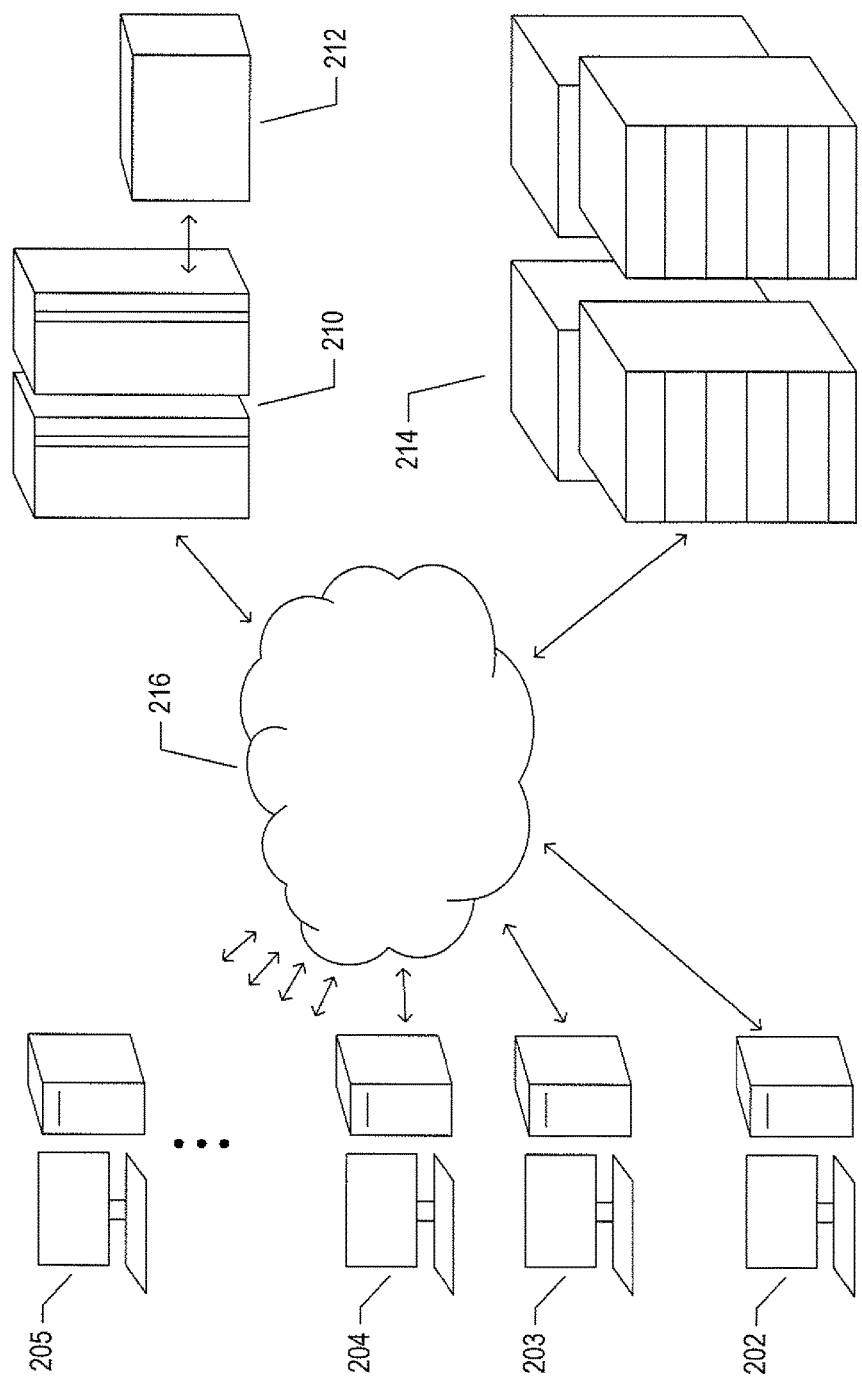
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
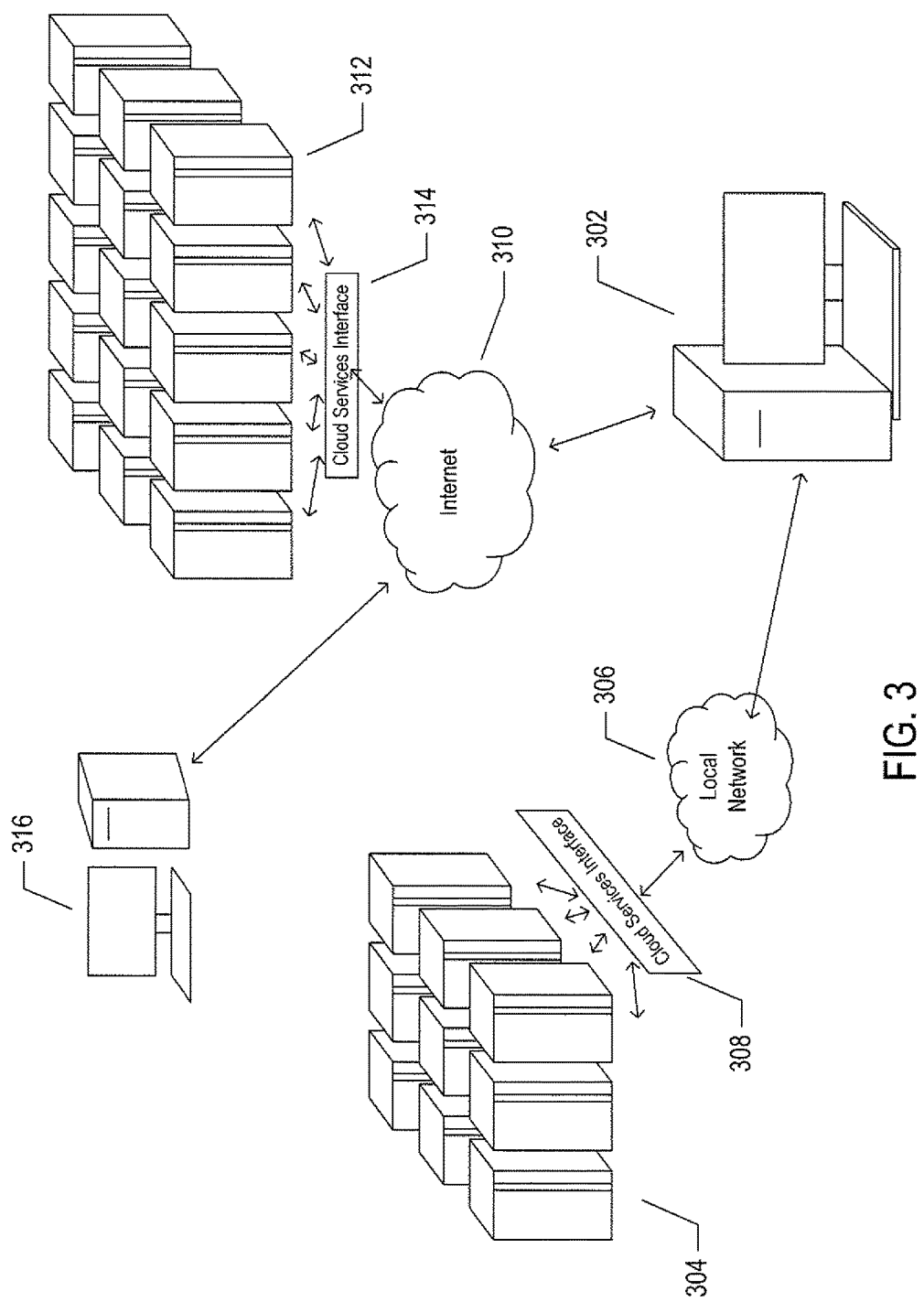
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
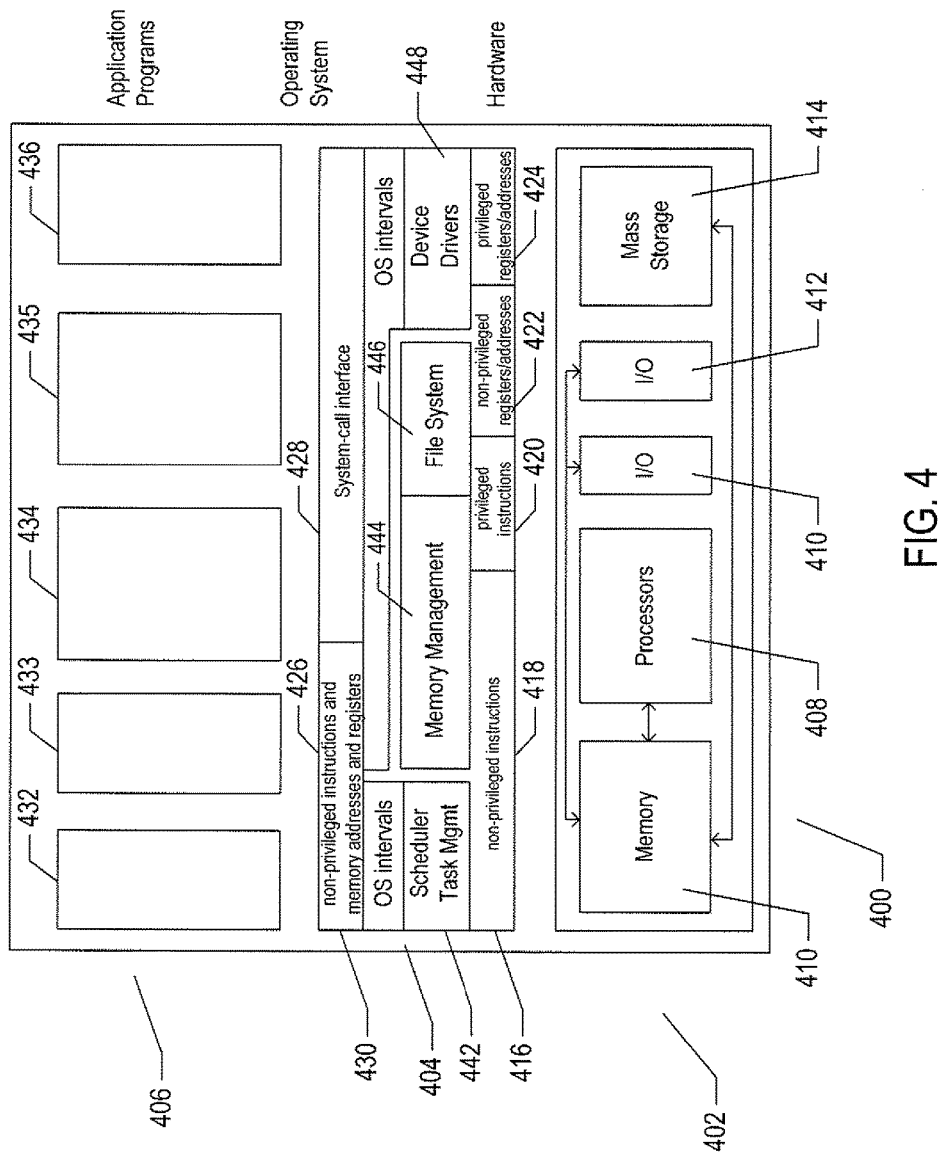
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
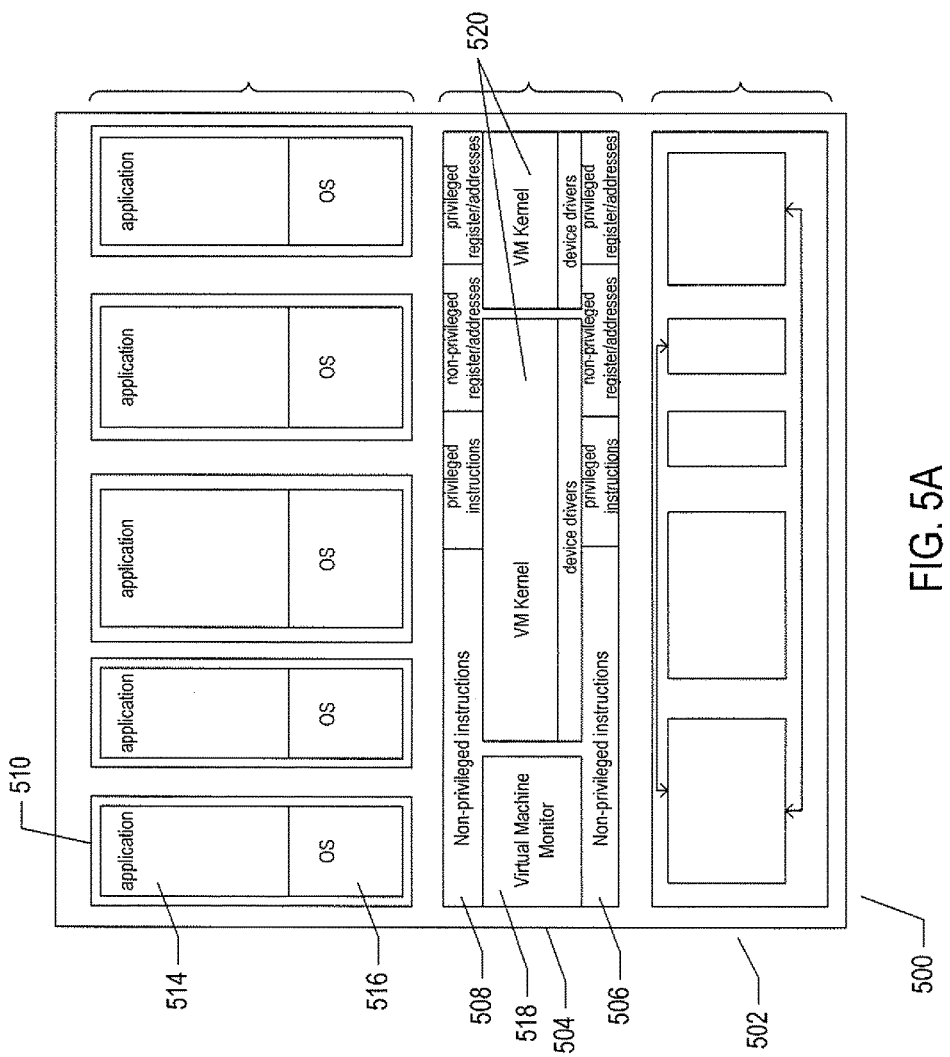
FIGS. 5A-B illustrate two types of virtual machine and virtual-machine execution environments.
Figure 5B:
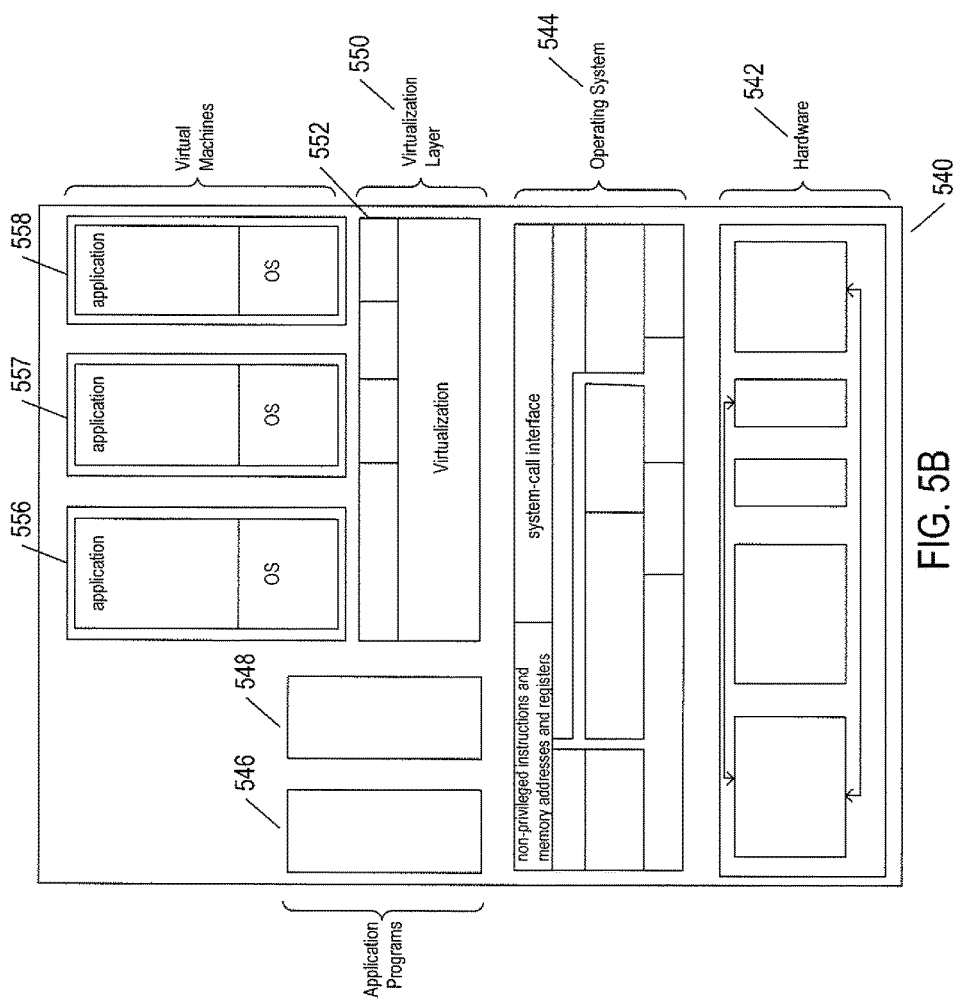

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512.

Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
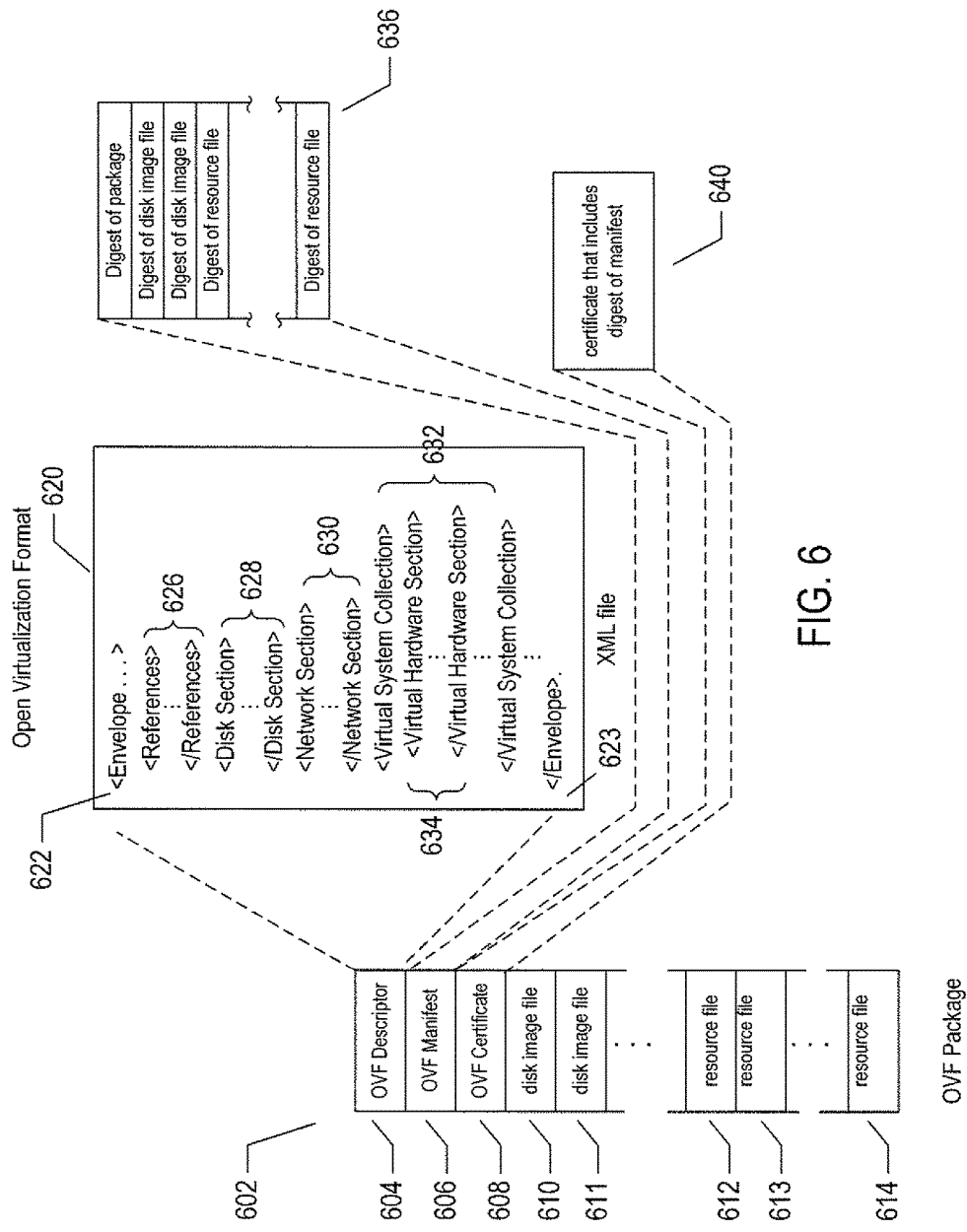
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
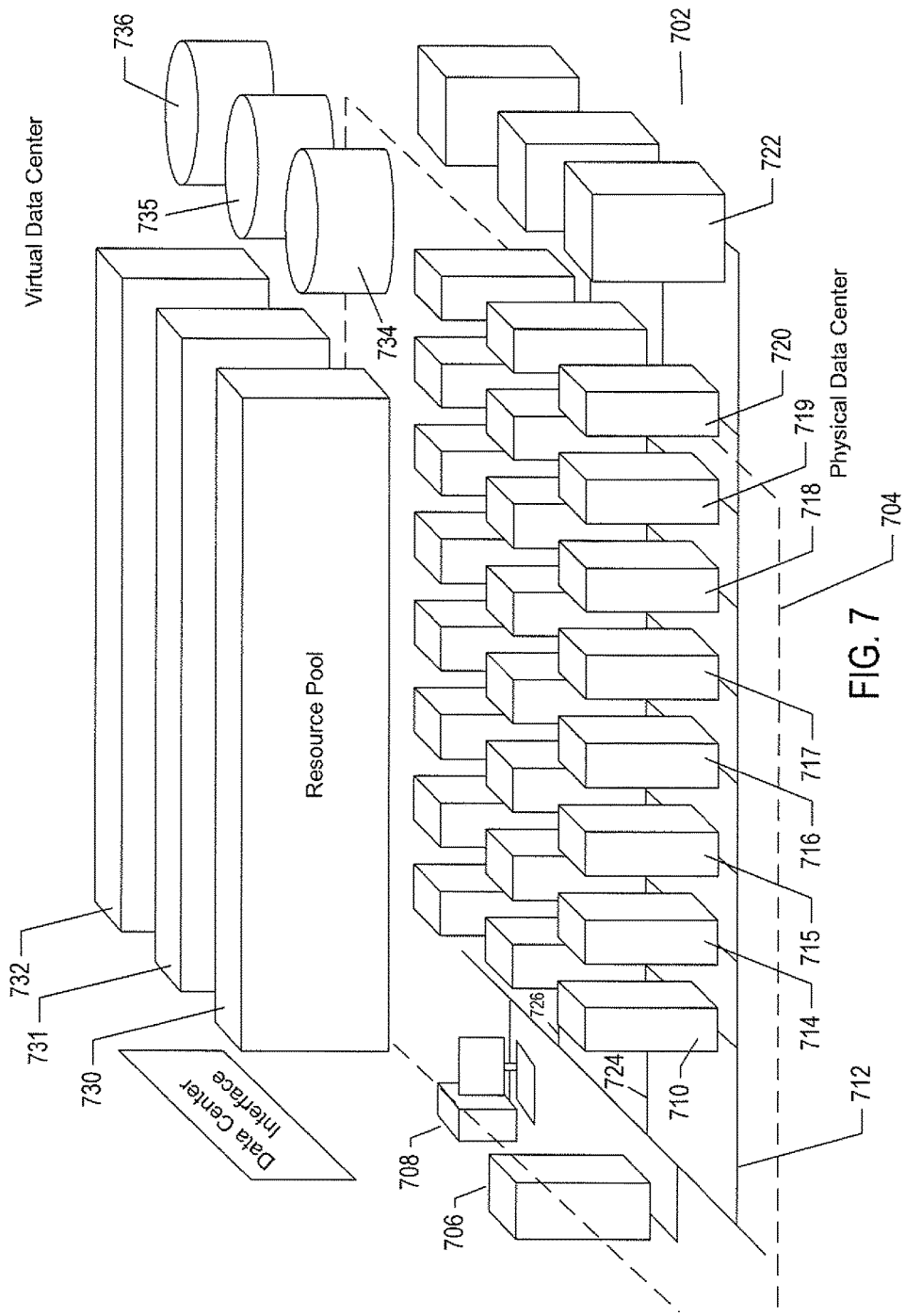
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
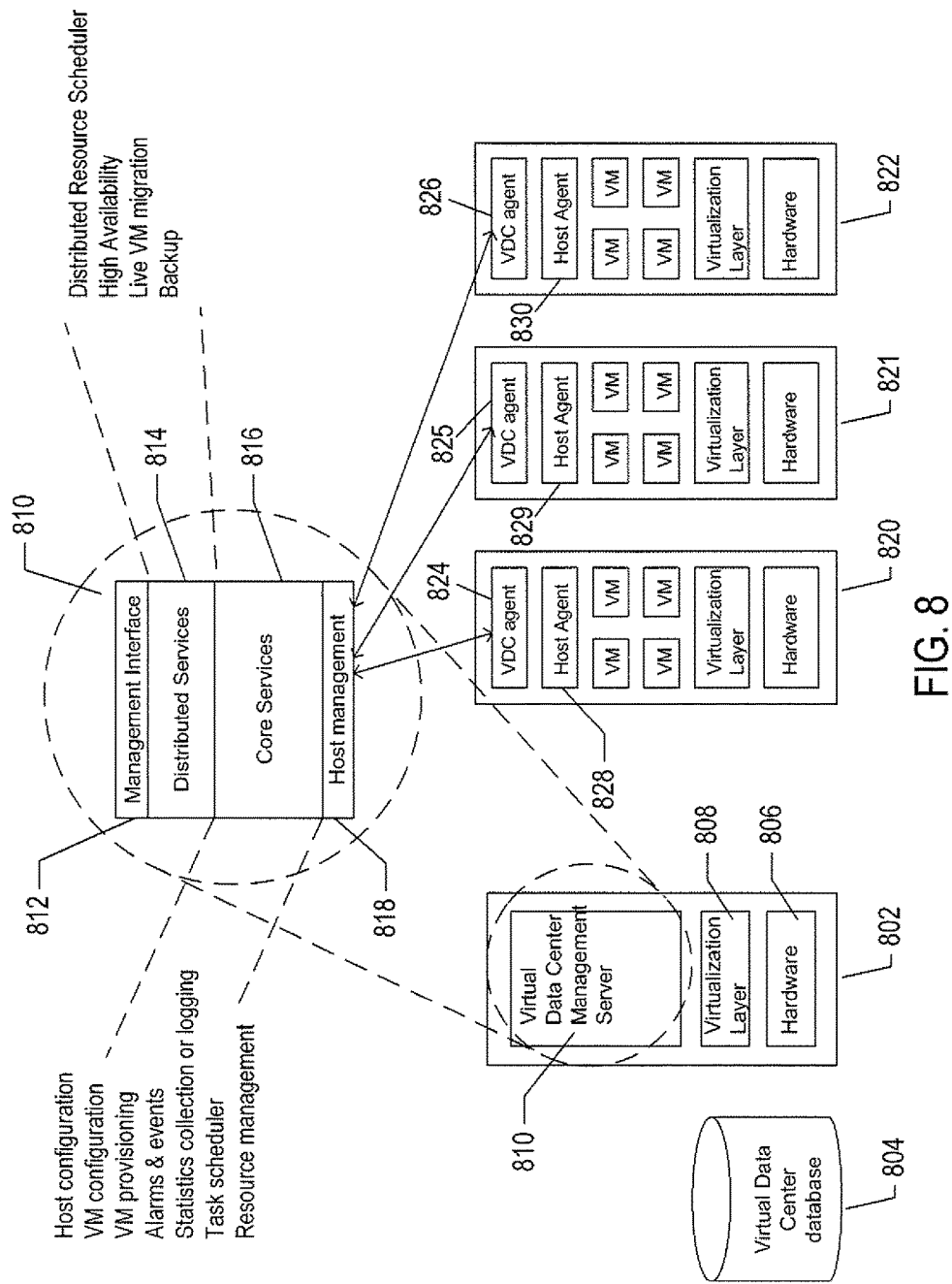
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
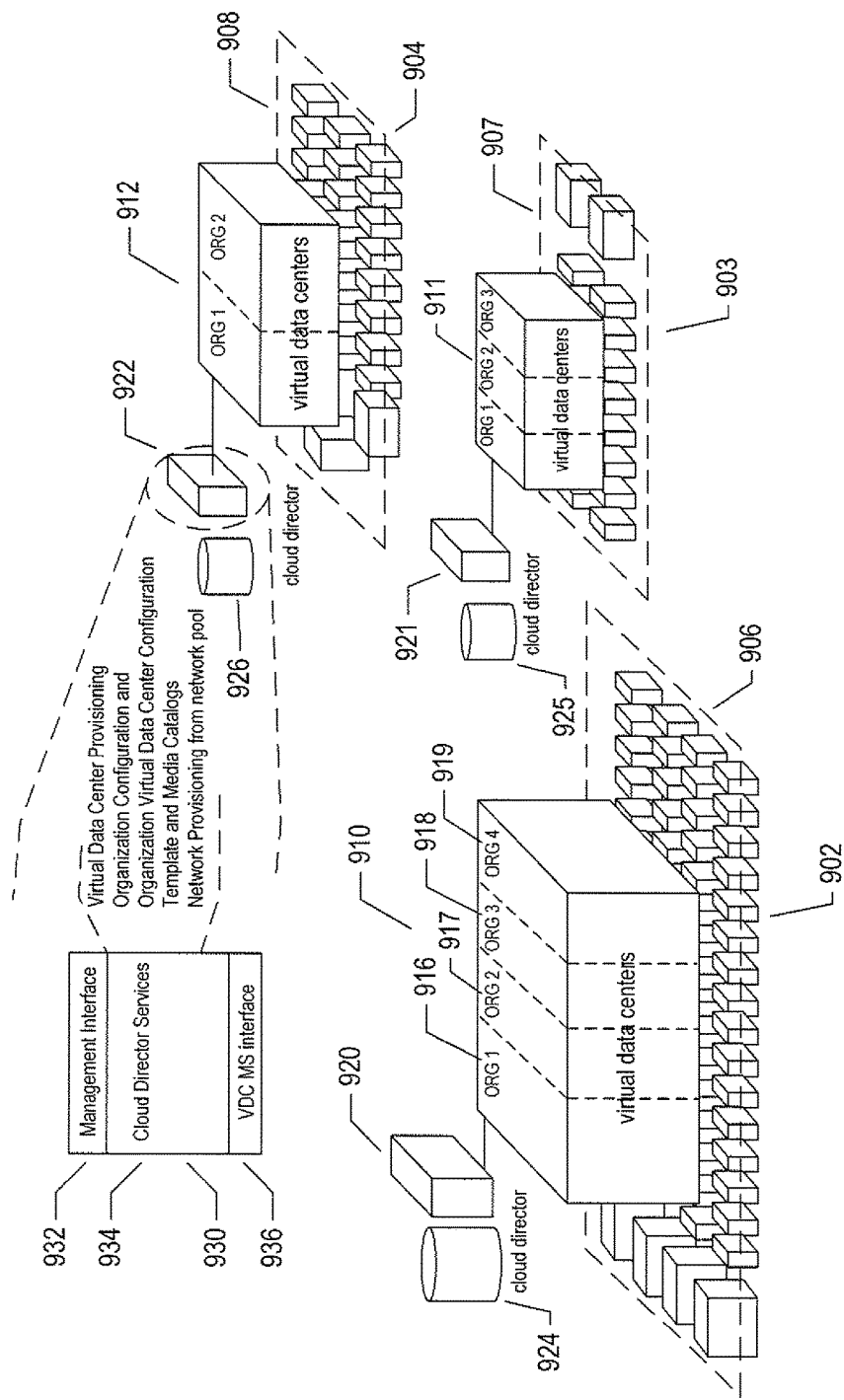
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
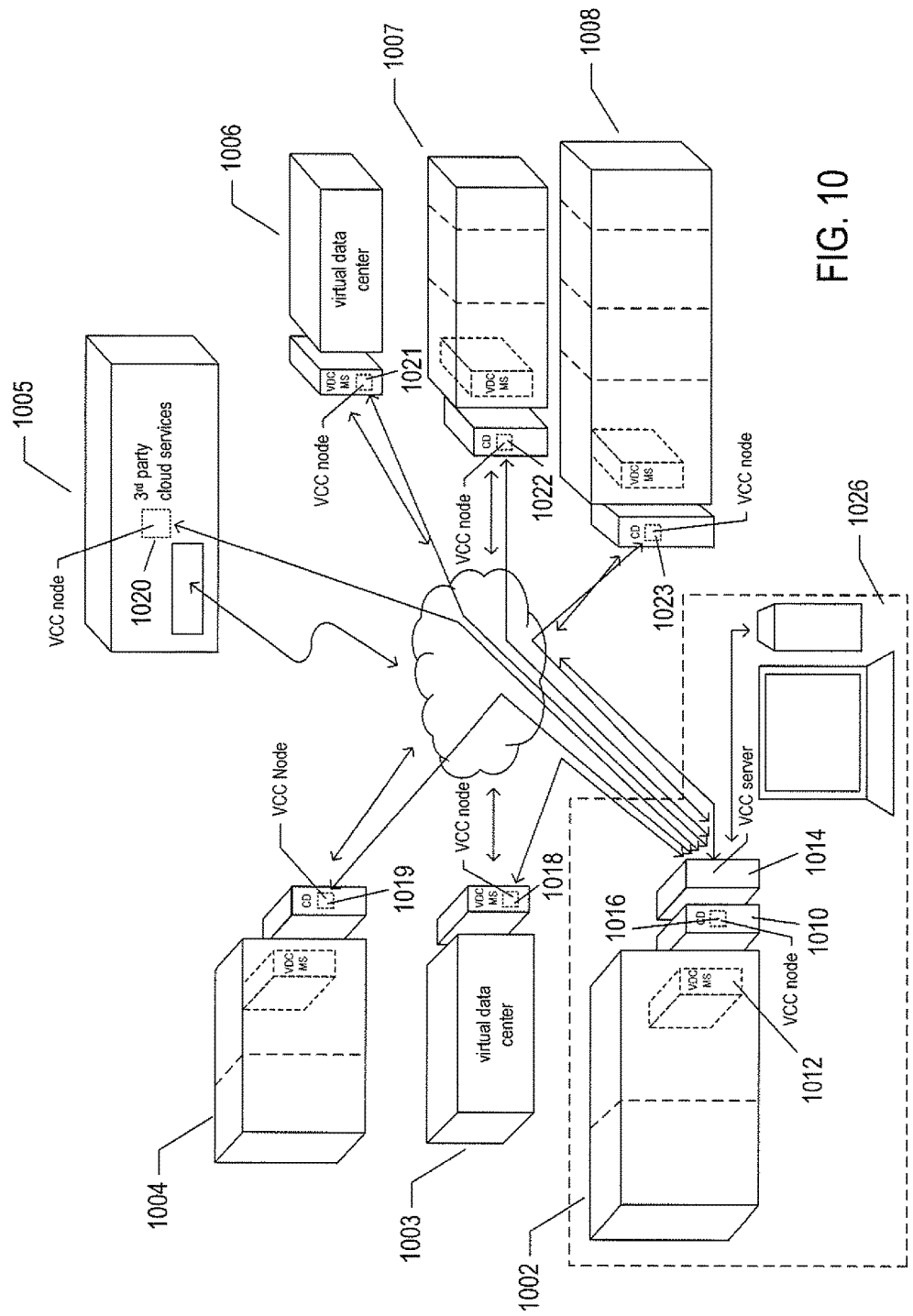
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Event-Message Clustering Methods and Systems

Figure 11:
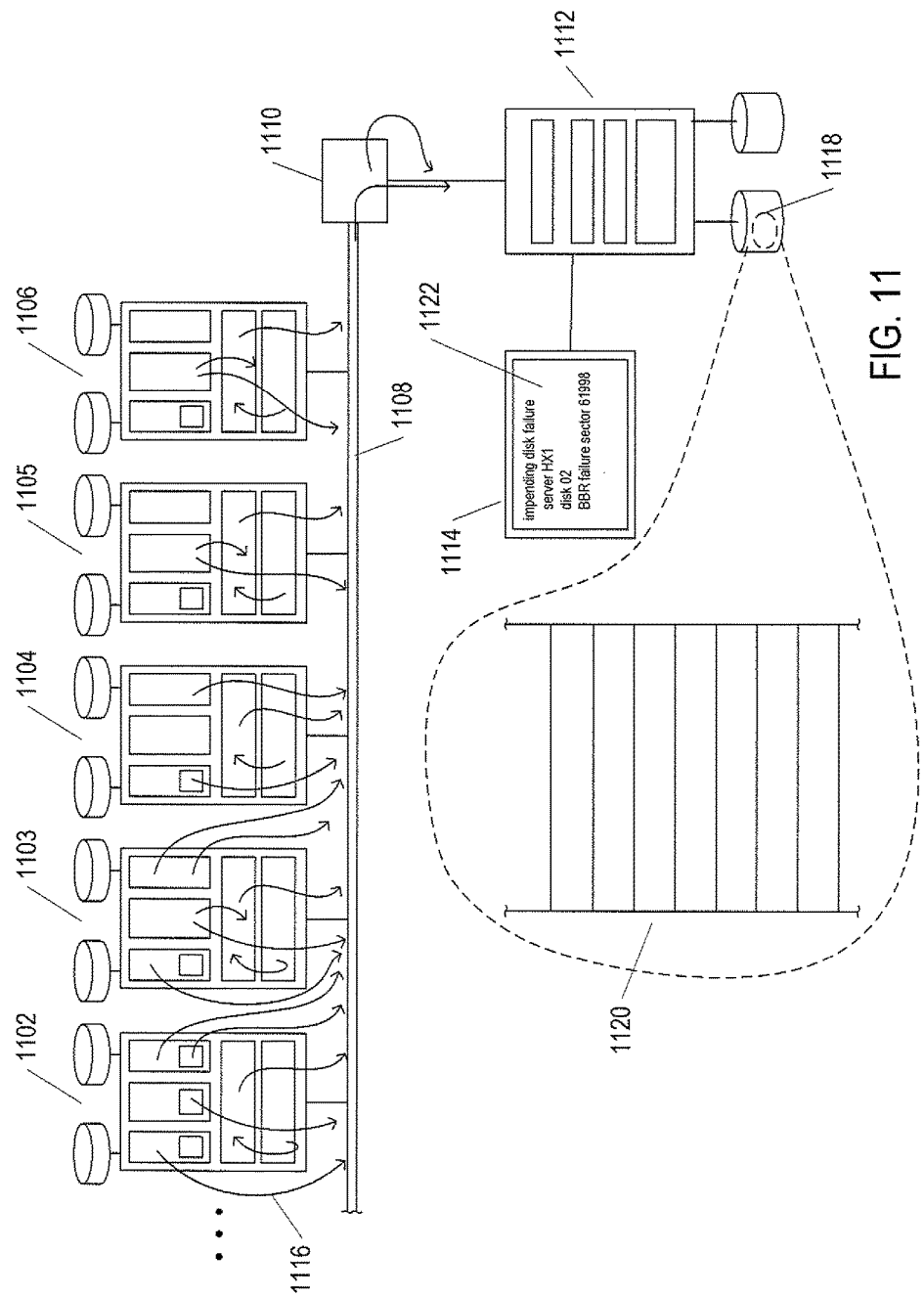
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computing systems. As mentioned above, a large, distributed computing system may generate and store terabytes of logged event messages during each day of operation. This represents an enormous amount of data to process, even were the individual event messages highly structured and precisely formatted to facilitate automated processing. However, event messages are not so structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. While text-search methodologies may be employed to search for relevant data within large log files, such methods are generally quite time-consuming and imprecise. A fourth problem associated with event messages in large, distributed computer systems is that storing and archiving event logs may itself represent a significant computational challenge. Given that many terabytes of event messages may be collected during the course of a single day of operation of a large, distributed computer system, collecting and storing the large volume of information represented by event messages may represent a significant processing-bandwidth, communications-subsystems bandwidth, and data-storage-capacity challenge, particularly when it may be necessary to reliably store event logs in ways that allow the event logs to be subsequently accessed for searching and analysis.

Figure 13:
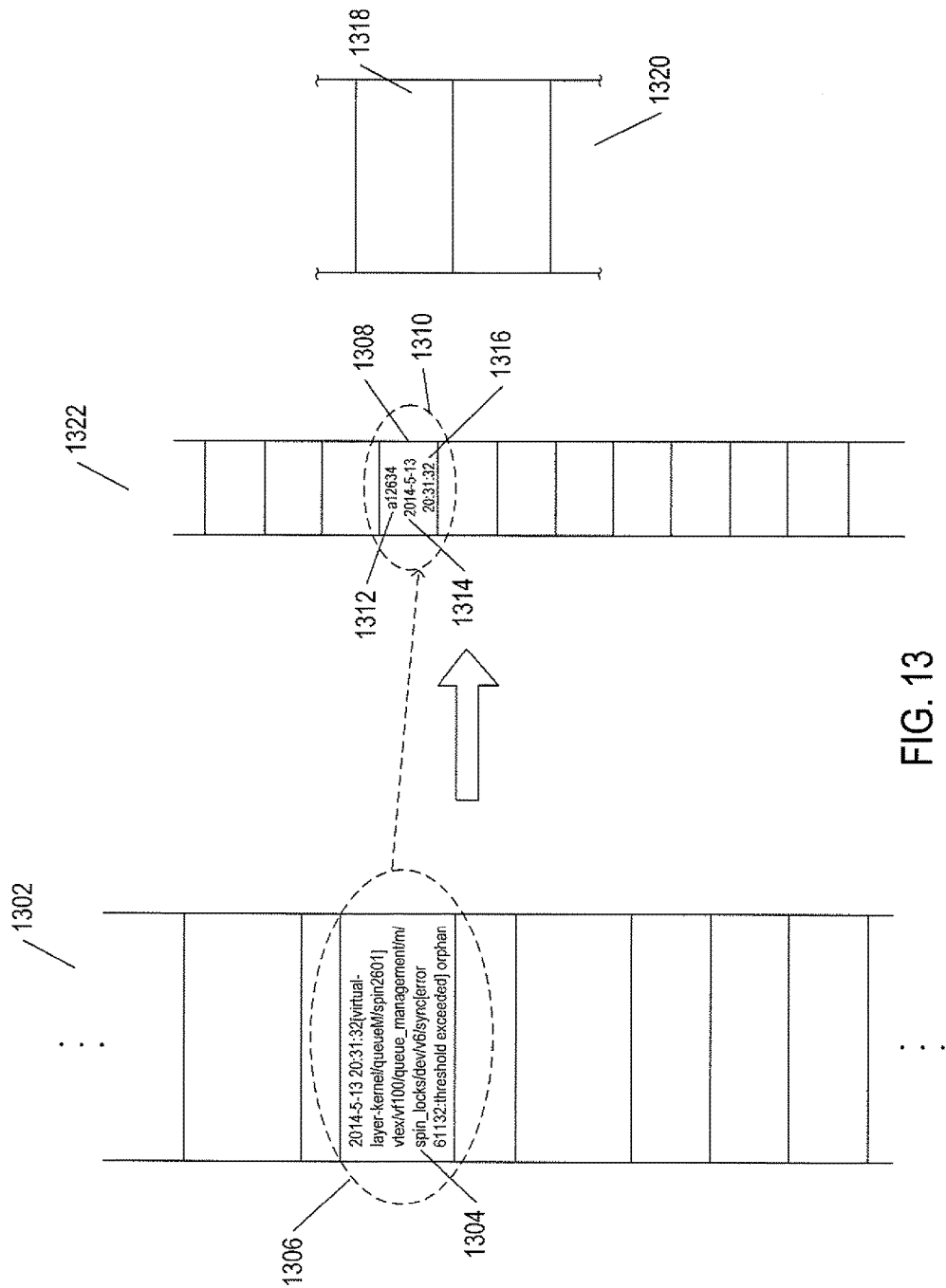
FIG. 13 illustrates the event-message-processing approach represented by the currently disclosed methods and systems.

The currently disclosed methods and systems for processing, classifying, and efficiently storing event messages, collectively referred to as "event-clustering methods and systems," have been devised to address the above-mentioned challenges associated with event-message processing and analysis as well as additional deficiencies and problems associated with currently available event-message processing, analysis, and storage. FIG. 13 illustrates the event-message-processing approach represented by the currently disclosed methods and systems. In FIG. 13, a traditional event log 1302 is shown as a column of event messages, including the event message 1304 shown within inset 1306. The methods and systems to which the current document are directed automatically process event messages, as they are received, in order to transform the received event messages into event records, such as event record 1308 shown within inset 1310. The event record 1308 includes a numeric event-type identifier 1312 as well as the values of parameters included in the original event message. In the example shown in FIG. 13, a date parameter 1314 and a time parameter 1315 are included in the event record 1308. The remaining portions of the event message, referred to as the "non-parameter portion of the event message," is separately stored in an entry in a table of non-parameter portions that includes an entry for each type of event message. For example, entry 1318 in table 1320 may contain an encoding of the non-parameter portion common to all event messages of type a12634 (1312 in FIG. 13). Thus, the methods and systems to which the current document is directed have the effect of transforming traditional event logs, such as event log 1302, into stored event records, such as event-record log 1322, and a generally very small table 1320 with encoded non-parameter portions, or templates, for each different type of event message.

The event-record log, such as event-record log 1322, and other types of accumulations of event records have numerous advantages over a traditional event-message log. A first advantage is that each event record is typed. Because the event records are typed, the event-record log can be easily searched, partitioned, and otherwise processed based on event-message types, which produces a significant computational advantage for downstream event-analysis and event-interpretation systems. A second advantage is that, as shown in FIG. 13, event-record logs are significantly compressed with respect to traditional event-message logs. Because only one copy of the non-parameter portion of each type of event message needs to be stored in the associated table, a significant data compression is achieved by the methods and systems to which the current document is directed. The compression ratios achieved depend on the average ratio of non-parameter characters to parameter characters in event messages. In many cases, compression ratios of between 2:1 and 10:1 can be achieved by storing event records rather than event messages. Because terabytes of event messages may be collected on a daily basis within a large, distributed computing system, this potential rate of data compression represents a significant decrease in computational and hardware-usage overheads. A third advantage of event-record logs in comparison to event-message logs is that the event-record logs are fully and uniformly structured, which additionally facilitates downstream automated analysis and interpretation. The downstream analysis and interpretation systems directly acquire relevant parameters and an event type from an event record, without the need for parsing and typing a large variety of different types of event messages.

Returning briefly to FIG. 11, it should be noted that the simple example illustrated in FIG. 11 fails to illustrate the entire problem space addressed by the methods and systems to which the current document is directed. In large, distributed computing systems, for example, it would be impractical to funnel all event messages to a single administration computer. Instead, processing, analysis, and storage of event messages is typically carried out by multiple discrete computer systems and is therefore also distributed. As a result, methods and systems for processing, typing, and efficiently storing event messages need to be both scalable and distributable over multiple computer systems in order to be generally useful over a range of different types of distributed computing systems as well as over significant time frames during which distributed computing systems may increase in size due to continuous addition of new processing components. The distributed virtual-data-center and virtual-cloud management systems discussed in the first subsection of the current document are examples of systems in which event-message processing, typing, and storage may be distributed over multiple computational nodes.

In the current application, the phrase "event-message-clustering system" refers to any of various standalone systems as well as subsystems and components of standalone systems and systems within distributed computing systems that carry out event-message clustering by the event-message-clustering methods to which the current document is directed. The phrase "event message" refers to any of various types of information entities include parameters and non-parametric portions to which the currently described clustering-based typing methods can be applied.

Figure 14A:
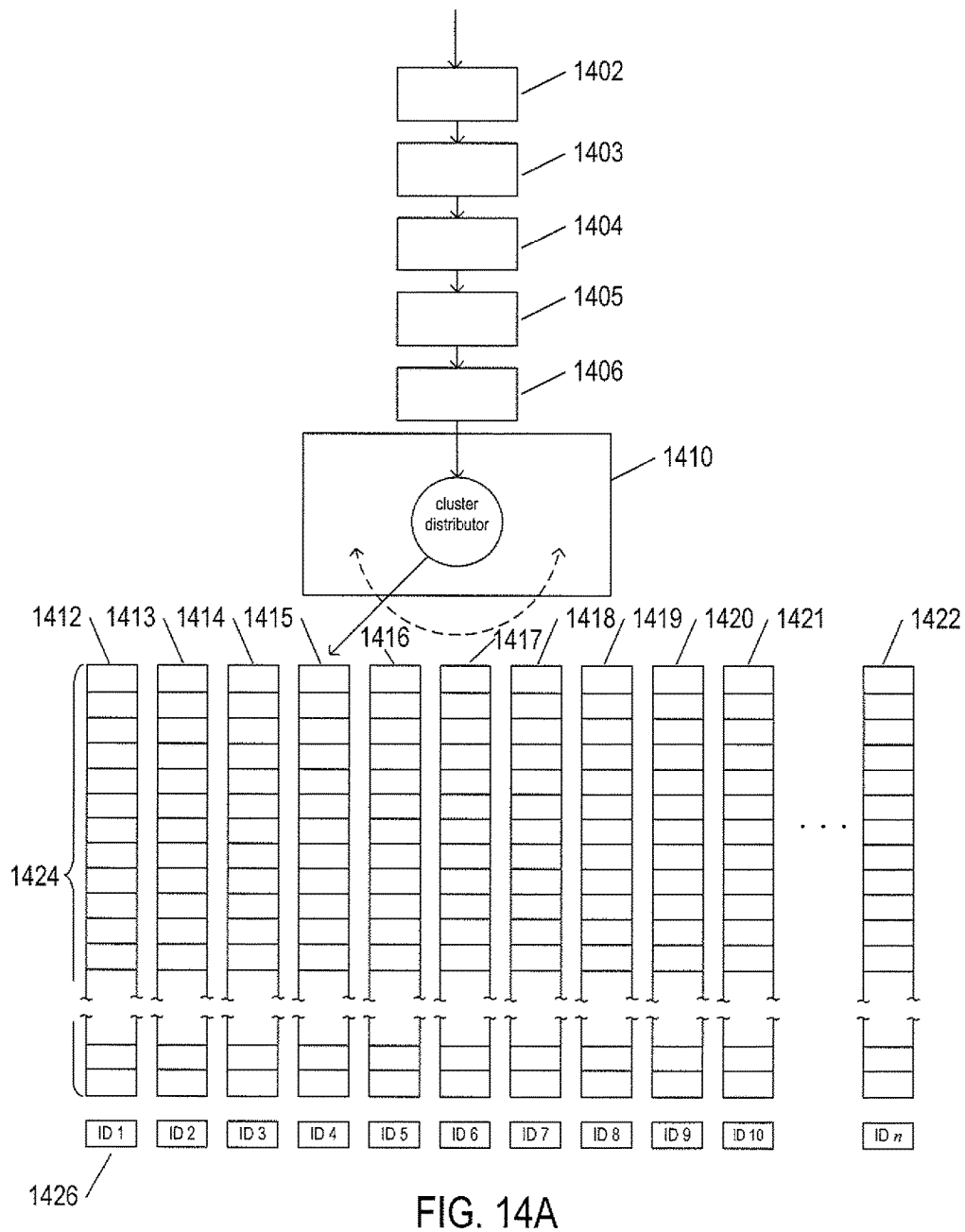
FIG. 14A illustrates one implementation of the clustering methods and systems to which the current document is directed.

FIG. 14A illustrates one implementation of the clustering methods and systems to which the current document is directed. Rectangles 1402-1406 represent incoming event messages to an event-message-clustering system. The event-message-clustering system includes an event-processing-and-distribution component 1410 and multiple clusters of event records 1412-1422. Each cluster includes stored event records, such as the stored event records 1424 of cluster 1412, and a cluster identifier, such as cluster identifier 1426 of cluster 1412. The event-message-clustering system 1410 processes each received event message to transform the received event message into an event record and determines to which cluster to assign the event record. The clusters represent a typing scheme for event messages. In other words, each cluster represents a message type. The event-message-clustering system 1410 operates in real time to transform event messages into event records and to type the event messages by assigning each event record corresponding to an event message to a particular cluster. The stored event records may be accessed by downstream event-analysis and event-interpretation systems. In certain implementations, the event records may be physically stored by separate systems. Event records may not only be accessed by other entities, but may be periodically flushed to event-record archives, copied to downstream event-record-processing components, and transferred to downstream event-record-processing components. Initially, when a cluster is first initialized and begins storing events, the cluster may store unprocessed event messages rather than event records for an initial period of time. Only when a sufficient number of event messages of a particular type have been accumulated can downstream analysis components provide tools to the event-message-clustering system that allow the event-message-clustering system 1410 to transform event messages into event records.

Figure 14B:
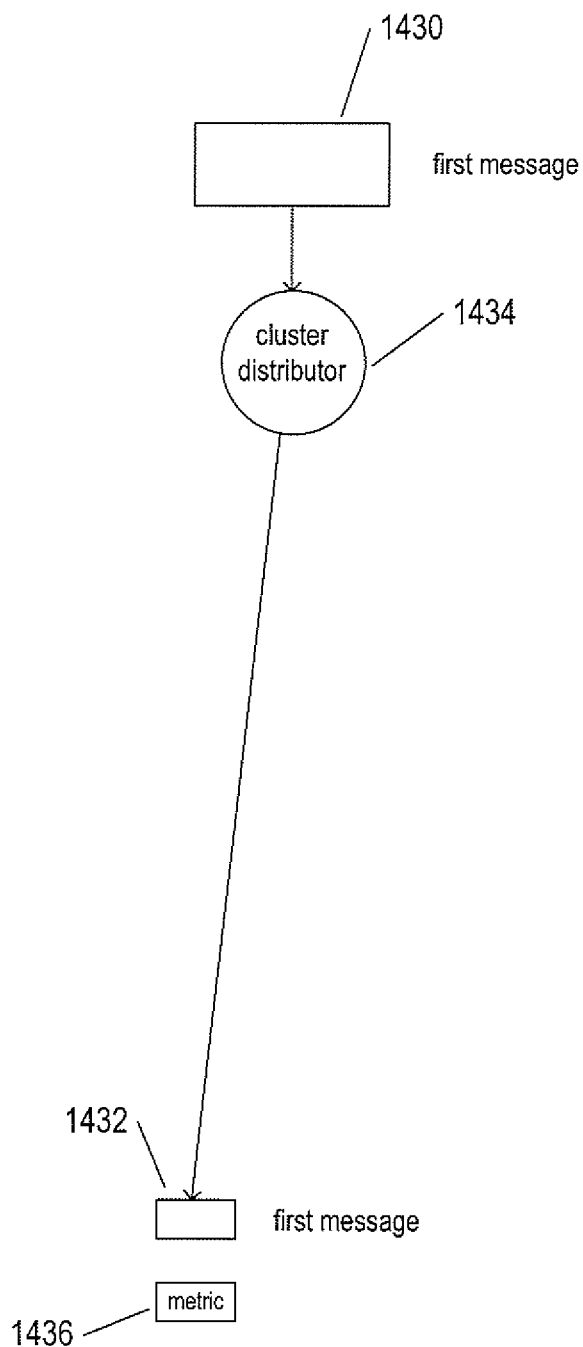
FIG. 14B illustrates processing of a first event message.

FIG. 14B illustrates processing of a first event message. Initially, there are no clusters. The first received event message 1430 initiates creation of a first cluster 1432 to which the cluster-distributor-component 1434 of the event-message-clustering system 1410 assigns the first event message. A temporary identifier 1436 is assigned to the first cluster.

Figure 14C:
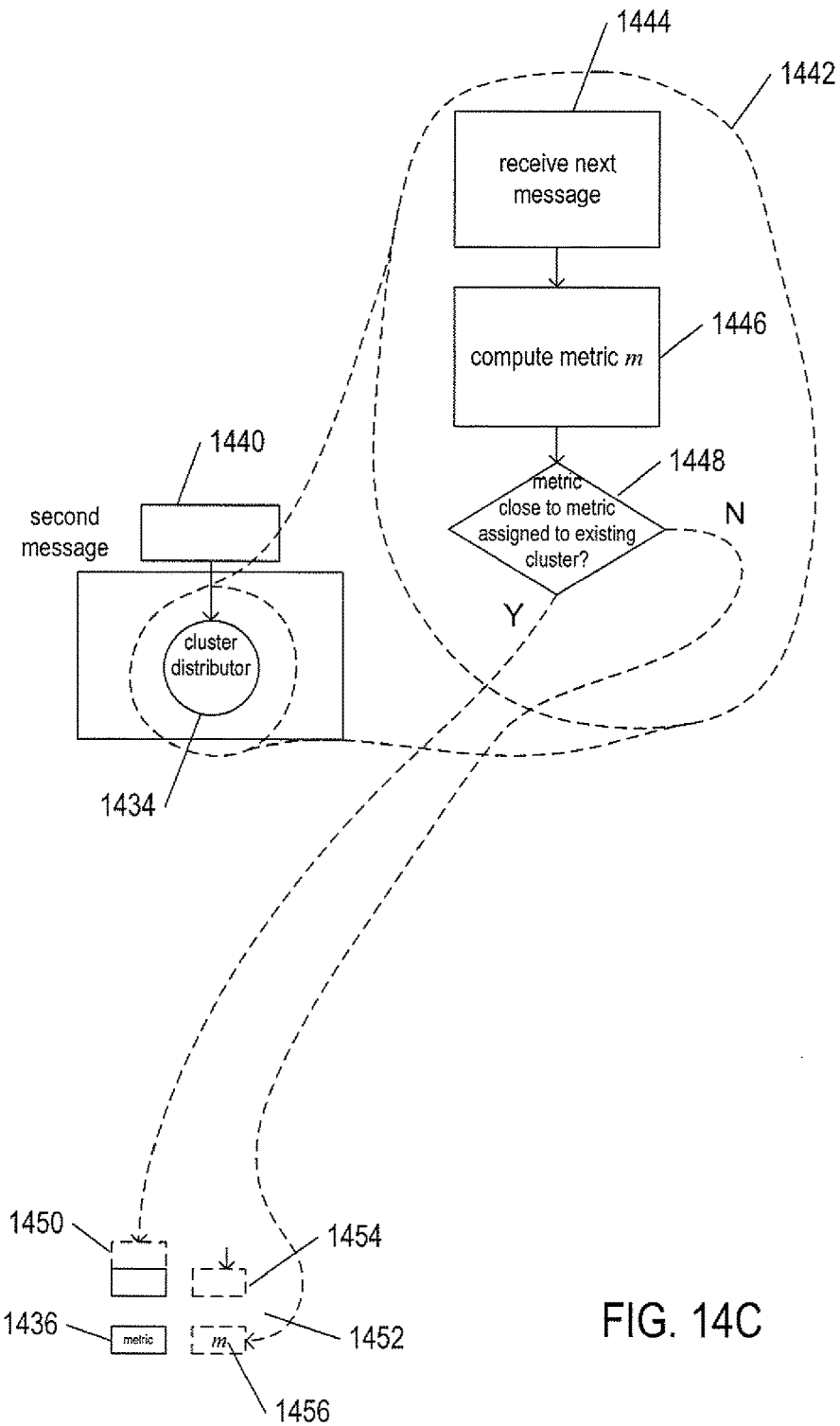
FIG. 14C illustrates processing of a second message.

FIG. 14C illustrates processing of a second message. The second event message 1440 is analyzed by the cluster distributor 1434 as represented by the logic shown in inset 1442. In step 1444, the cluster distributor receives the second message and, in step 1446, computes a numeric metric m for the received event message. In conditional step 1448, the cluster distributor determines whether the computed metric is close to the metric 1436 assigned to the first cluster. If the computed metric m for the second event message is sufficiently close to the metric 1436 assigned to the first cluster, then the second message is added to the first cluster 1450. Otherwise, a new cluster is created 1452 and the second event message is added to the new cluster 1454. The metric computed for the second event message in is assigned as the metric associated with the new, second cluster 1456. Subsequently received event messages are similarly processed. Either a subsequently received event message is assigned to an existing cluster, when a metric computed for the subsequently received event message is sufficiently close to a metric for an existing cluster, or a new cluster is created and the subsequently received event message becomes the first event message assigned to the new cluster. Thus, clusters are created dynamically as event messages are received and processed.

Figure 15:
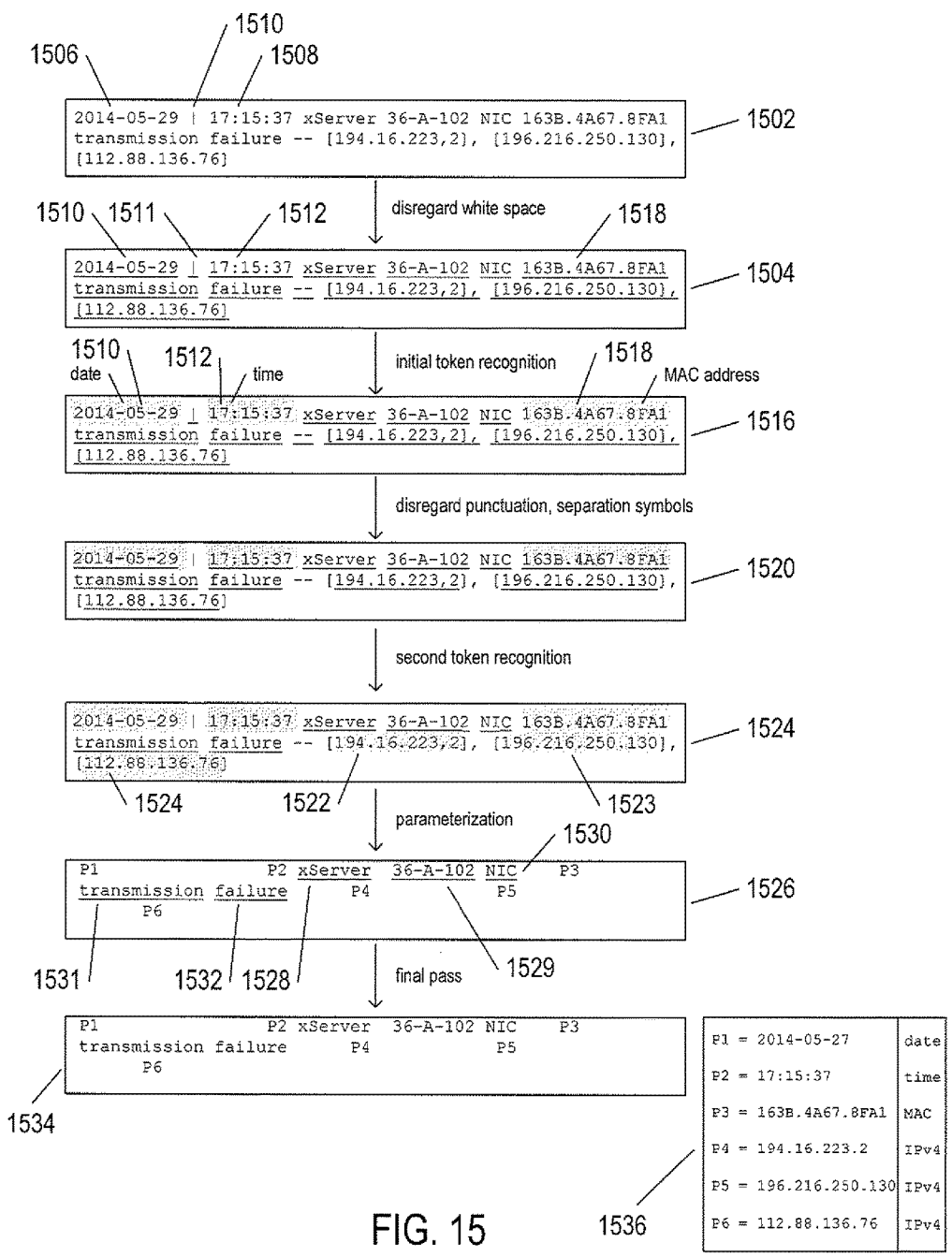

FIGS. 15-20 illustrate one implementation of the logic used by an event-message-clustering system to compute a metric for a received event message that allows the event message to be assigned to a particular existing cluster. FIG. 15 illustrates one implementation of an event-message-normalization procedure that is used to prepare an event message for computation of a metric. The received event message 1502 is first tokenized by considering the event message to consist of tokens separated by non-printing characters, referred to as "white space." In FIG. 15, this initial tokenization of the event message 1504 is illustrated by underlining of the printed or visible characters. For example, the date 1506, time 1508, and vertical bar 1510 at the beginning of the text contents of the event message 1502, following initial tokenization, become a first token 1510, a second token 1511, and a third token 1512, as indicated by underlining.

Next, an initial token-recognition pass is made to recognize any of the initial tokens as various types of parameter values. Parameter values are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of a type of event. By contrast, the phrase "transmission failure" in event message 1502 likely occurs within each of a large number of transmission-failure event messages. In FIG. 15, the recognized tokens in the event message following initial token recognition 1516 are indicated by shading. In the example shown in FIG. 15, initial token recognition determines that the first token 1510 is a date, the third token 1512 is a time, and the seventh token 1518 is a media access control address ("MAC address"). Various types of symbolically encoded values, including dates, times, machine addresses, network addresses, and other such parameter values can be recognized using regular expressions or programmatically. For example, there are numerous ways to represent dates. A relatively simple program or a simple set of regular expressions can be written to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter value. The currently described methods and systems do not depend on absolute precision and reliability of the event-message-normalization process. Occasional misinterpretations generally do not result in mistyping of event messages and, in the rare circumstances in which event messages may be mistyped, the mistyping is most often discovered during subsequent processing. Relatively computationally straightforward processing methods are adopted in the currently described methods and systems for normalization and typing of event messages, because event messages are generally continuously received at high rates, as a result of which the computational overhead associated with processing of each event message represents a significant constraint.

In certain implementations, normalization may terminate following initial token recognition. In the implementation illustrated in FIG. 15, the event message is subject to an additional token-recognition step after re-tokenizing the non-parameter portions of the event message by removing punctuation and separation symbols, such as brackets, commas, and dashes that occur as separate tokens or that occur at the leading and trailing extremities of previously recognized tokens, as shown by underlining in the event message 1520 in FIG. 15. After removal of the punctuation and separation symbols, an additional token-recognition pass in the example of FIG. 15 recognizes additional types of symbolically encoded parameter values, including the three version-4 Internet-protocol ("IPv4") addresses 1522-1524 in event message 1524.

Those tokens that have been recognized in the two token-recognition passes are considered to be parameters, denoted "P1," "P2," . . . "P6" in the parameterized event message 1526 in FIG. 15. The remaining tokens 1528-1532 represent the non-parameter tokens present within the event message. A final pass may involve promoting one or more of the non-parameter tokens to parameters based on certain criteria. For example, token 1529 in the parameterized event message 1526 might be considered to be a parameter value that represents the identifier of a server. In the example shown in FIG. 15, however, no additional tokens are promoted to the status of parameter values following the final pass 1534. The result of normalization is therefore a sequence of non-parameter tokens interspersed with parameter values 1534 and a table 1536 that shows the type and symbol encodings for the parameter values. There are many computational techniques for encoding a list of non-parameter tokens recognized within an event message including, as one example, a list of pointers and associated string lengths.

FIG. 16 illustrates the computation of the Adler cyclic redundancy check ("CRC") value from a token comprising a string of characters. As shown at the top of FIG. 16, the token can be thought of as an array of characters 1602 S. Two 16-bit values $A_n$ and $B_n$ are computed as indicated by the recursive expressions 1604 in FIG. 16. The high and low bytes of the two 16-bit values $A_n$ and $B_n$ are arranged 1606 into a 32-bit value that constitutes the Adler CRC for the token. The Adler CRC values are computed, in many cases, to recognize corruptions of a token following network transmission or other such operations. Small one-bit and two-bit transmission errors result in very different Adler CRC values computed for the original token and corrupted token received through an error-introducing communications medium. In one implementation of the currently described methods and systems, the Adler CRC is used for computing a metric m for an event message.

Figure 17:
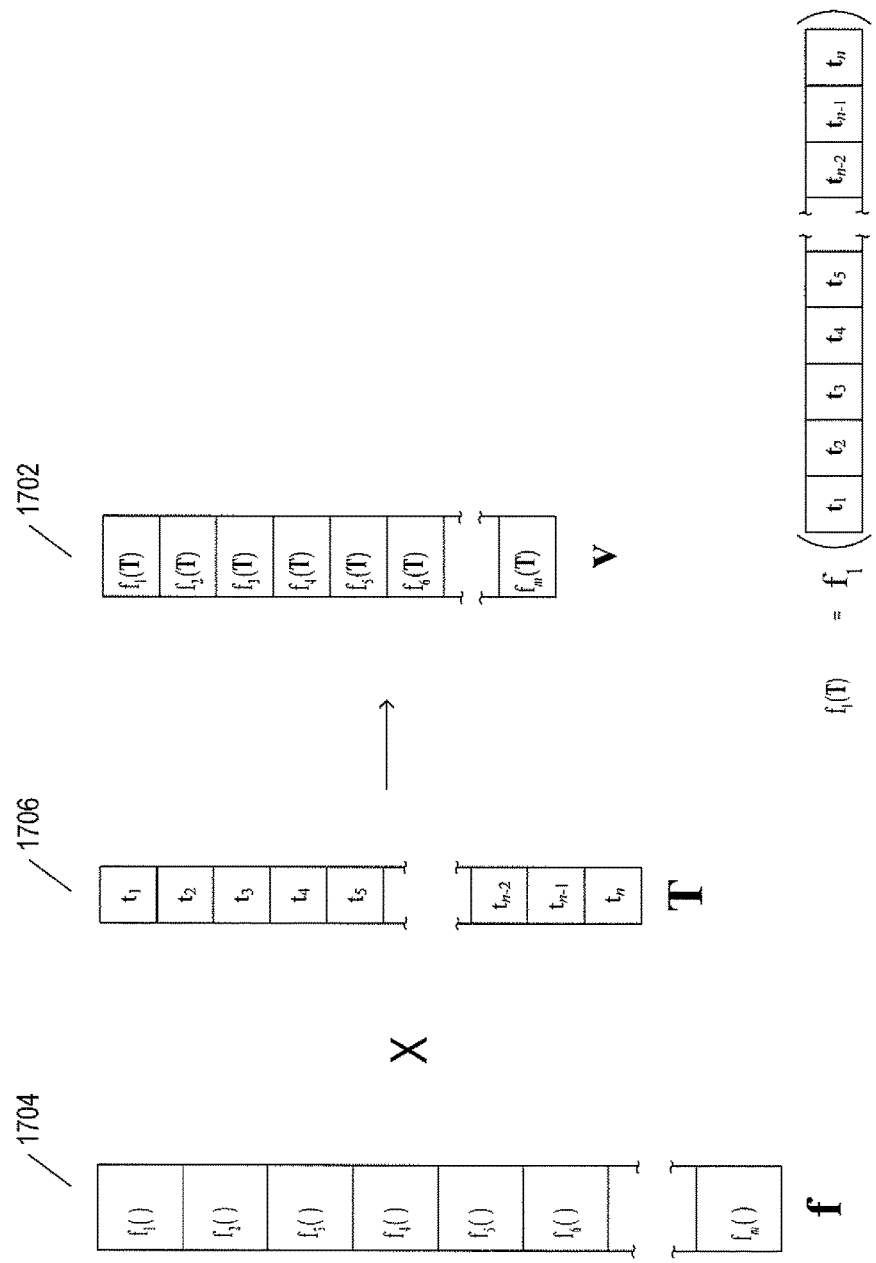

FIG. 17 illustrates computation of a metric m for an event message. In certain implementations of the currently described methods and systems, the metric m is a vector of integer values. This vector, referred to as a "feature vector," can be thought of as being computed by a matrix-multiplication-like operation. In FIG. 17, the feature vector v 1702 is produced by a matrix-multiplication-like operation in which a matrix-like vector of in functions 1704, each of which takes n arguments is multiplied by a vector of non-parameter tokens identified within an event message 1706 to produce the feature vector v 1702. The number of elements, or number of dimensions, of the feature vector v is equal to the number of functions in the matrix-like function vector f and the number of arguments supplied to each function n is equal to the number of non-parameter tokens n in the ordered set of non-parameter tokens T corresponding to an event message.

Figure 18C:
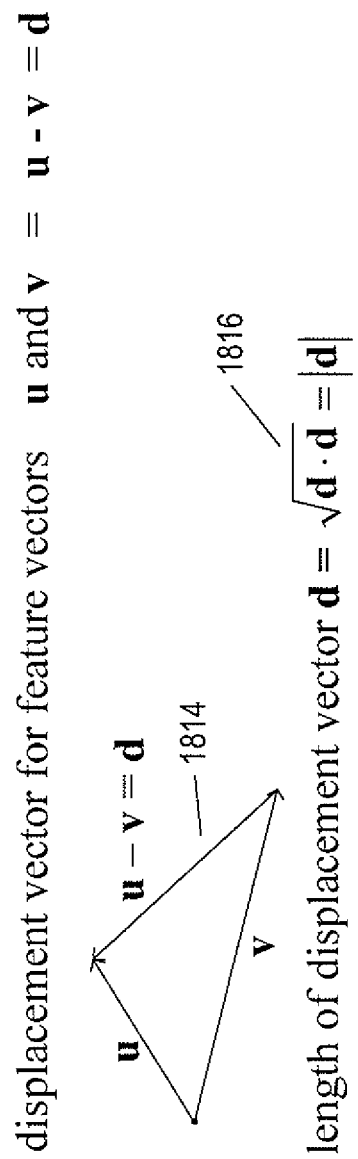

FIGS. 18A-C illustrate computation of the distance between two points represented by vectors. Vectors of dimension n can be thought of as directed distances in an n-dimensional space or as the coordinates for points in an n-dimensional space, where the ray between the origin and the point is equal to the directed distance represented by the vector. FIG. 18A illustrates vector subtraction, in which a vector v 1802 is subtracted from a vector u 1804 to produce the result vector u−v 1806. FIG. 18B shows the computation of the dot product u·v of two vectors u and v. The dot product 1808 can be viewed as a matrix multiplication between the transpose of the first vector 1810 and the second vector 1812. FIG. 18C illustrates computation of the distance between two points represented by two vectors u and v. First, a displacement vector d is computed as u−v 1814. Then, the length of the displacement vector is computed as the square root of the dot product of the displacement vector 1816. The distance between two event messages can be similarly calculated as the square root of the dot product of the difference, or displacement vector, computed from the two feature vectors corresponding to the two event messages. Thus, the metric m computed by one implementation of the event-message-clustering system, discussed in FIGS. 14A-C, is a feature vector and an event message is assigned to that cluster for which the distance between the event message and the first event message assigned to the cluster is minimal. In other words, the clusters represent regions in an m-dimensional space that contain similar event messages.

FIGS. 19 and 20 illustrate one particular implementation for computing feature vectors and the distance between event messages represented by feature vectors. As shown in FIG. 19, the function $f_i(\ )$ for computing the value of element i of a feature vector, in the described implementation, is:

$$f_i(T) = \underset{j}{\arg\max}\ ([P_i * Adler(t_j) + Q_i] mod\ 0xfffffff).$$

In essence, the function $f_i(\ )$ computes, for each non-parameter token $t_j$ in the event message T, the Adler CRC value, multiplies the Adler CRC value for $t_j$ by a first constant, and then adds a second constant to the product of the Adler CRC value for $t_j$ and the first constant. The result is truncated to a 32-bit value using a mod operation. The function $f_i(\ )$ returns the maximum of these computed values for each of the non-parameter tokens. FIG. 19 provides an example using the example tokenized event message 1534 of FIG. 15. The non-parameter tokens together comprise an ordered set of tokens T 1904. The function $f_i(\ )$ computes a 32-bit value $h_j$ for each non-parameter token $t_j$ as shown in the set of five expressions 1906. The function $f_i(\ )$ returns the maximum of these computed values 1908.

FIG. 20 illustrates computing the distance between two event messages represented by two feature vectors computed for the two event messages. FIG. 20 shows a first feature vector u 2002 corresponding to one event message and a second feature vector v 2004 corresponding to another event message. To compute the distance between the two event messages, a displacement feature vector d 2006 is first computed. Because the values of the feature-vector elements are computed based on Adler CRC values, differences between elements do not correspond to distances in particular dimensions, since CRC functions tend to produce very different values for different, but similar tokens. Therefore, when two corresponding elements of two feature vectors are identical, and their differences equal to zero, then the distance-metric for these element values is zero, but when the difference between two corresponding feature-vector element values is non-zero, it can only be concluded that the corresponding feature-vector element values are different and thus are separated by some distance in the corresponding dimension. In the described implementation, all non-zero element values in the displacement vector 2006 are replaced by the value "1" to produce a modified displacement vector d' 2008. The square root of the dot product of the modified displacement vector 2010 is equal to the number of non-matching feature-vector elements in the two feature vectors u and v or, equivalently, to the number of non-zero elements in the modified displacement vector d'. However, the square root of the dot product of the modified displacement vector is a type of displacement-based metric, just not the familiar Euclidean, or L2, distance metric. Were a similarity-preserving hash function used, rather than the Adler CRC, in computing the feature vector, a stepwise distance metric closer to the L2 distance metric would be computable from the feature vectors representing two event messages.

Figure 21:
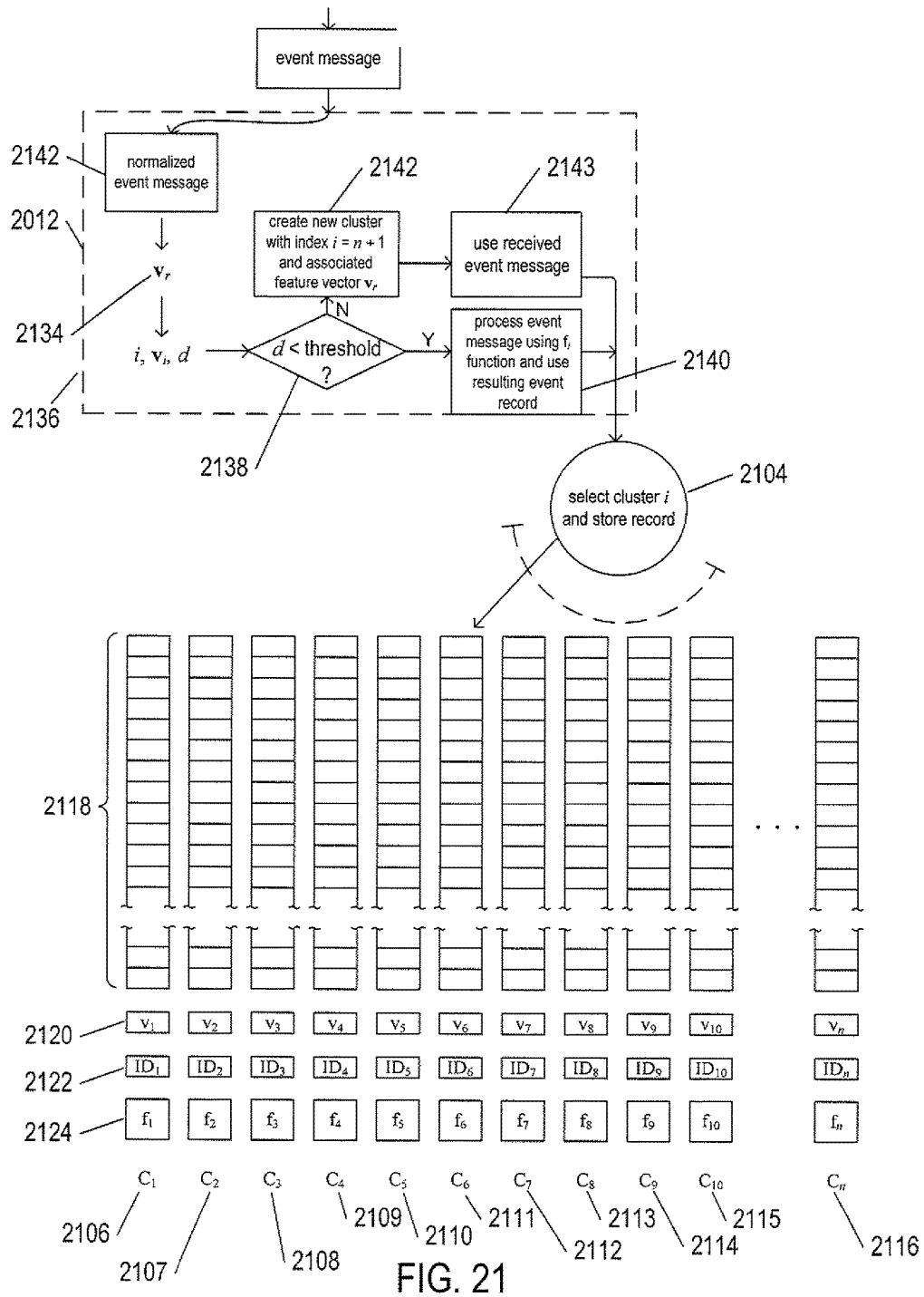
FIG. 21 illustrates an implementation of the event-message-clustering system to which the current document is directed at a greater level of detail than, but using the same illustration conventions as used in, FIG. 14A.

FIG. 21 illustrates an implementation of the event-message-clustering system to which the current document is directed at a greater level of detail than, but using the same illustration conventions as used in, FIG. 14A. In FIG. 21, the event-message-clustering system includes event-message-processing logic 2102, a distributor component 2104, and a set of n clusters 2106-2116. Each cluster includes a number of assigned event records, such as the assigned event records 2118 for cluster 2106, a feature vector for the cluster, such as feature-vector 2120 for cluster 2106, a cluster identifier, such as cluster identifier 2122 for cluster 2106, and a processing function, such as processing function 2124 for cluster 2106, that can be used by the event-message-clustering system to parse an event message in order to extract parameter values from the event message. As discussed above with reference to FIG. 14A, after a cluster is first created, the cluster temporarily stores event messages, rather than event records, and is associated with a temporary ID and no parsing function. However, once downstream analysis systems have analyzed an initial set of event messages associated with, or assigned to, the cluster, the downstream analysis systems provide a final identifier and parsing function for the cluster to the event-message-clustering system. When a next event message 2130 is received by the event-message-clustering system, the event message is normalized 2142, as discussed above with reference to FIG. 15, and a feature vector $v_r$ 2134 is computed for the normalized event message, as discussed above with reference to FIGS. 16-18. The computed feature vector $v_r$ is compared with all of the feature vectors for the n clusters to determine a cluster i associated with feature vector $v_i$ for which the distance d computed for $v_r$ and $v_i$ is minimal 2136. When d is less than a threshold value 2138, the event message is processed using function $f_i$ associated with cluster i to produce a corresponding event record which is output, along with the cluster index i, to the distributor subcomponent 2104. Otherwise, when d is not less than the threshold 2138, a new cluster is created with index i=n+1, the feature vector computed for the received event message $v_r$ is associated with this cluster 2142, and the received event message is passed, along with the cluster index, to the distributor subcomponent 2104. The distributor subcomponent 2104 then assigns the event message or event record to the cluster with index i. Again, the event messages and event records associated with clusters may be physically stored by the event-message-clustering system or may be stored by another component, with the event-message-clustering system either returning event messages and event records to requesting downstream components or references to event messages and event records stored in another component. Event records and event messages may be deleted form clusters, copied to other locations, and periodically archived.

The feature-vector-based typing of event messages provides a first estimate of event-message classification. However, downstream analytical components that analyze event messages may determine that two or more clusters represent a single event-message type and may therefore request that the clusters corresponding to these types be merged together. Similarly, downstream analytic components may determine that the event messages in a particular cluster actually have two or more different types and may therefore request the event-message-clustering system to split the cluster into two or more clusters. The merge and split operations thus allow a refinement or fine tuning of the initial feature-vector-based event-message typing carried out by the event-message-clustering system.

Figure 22:
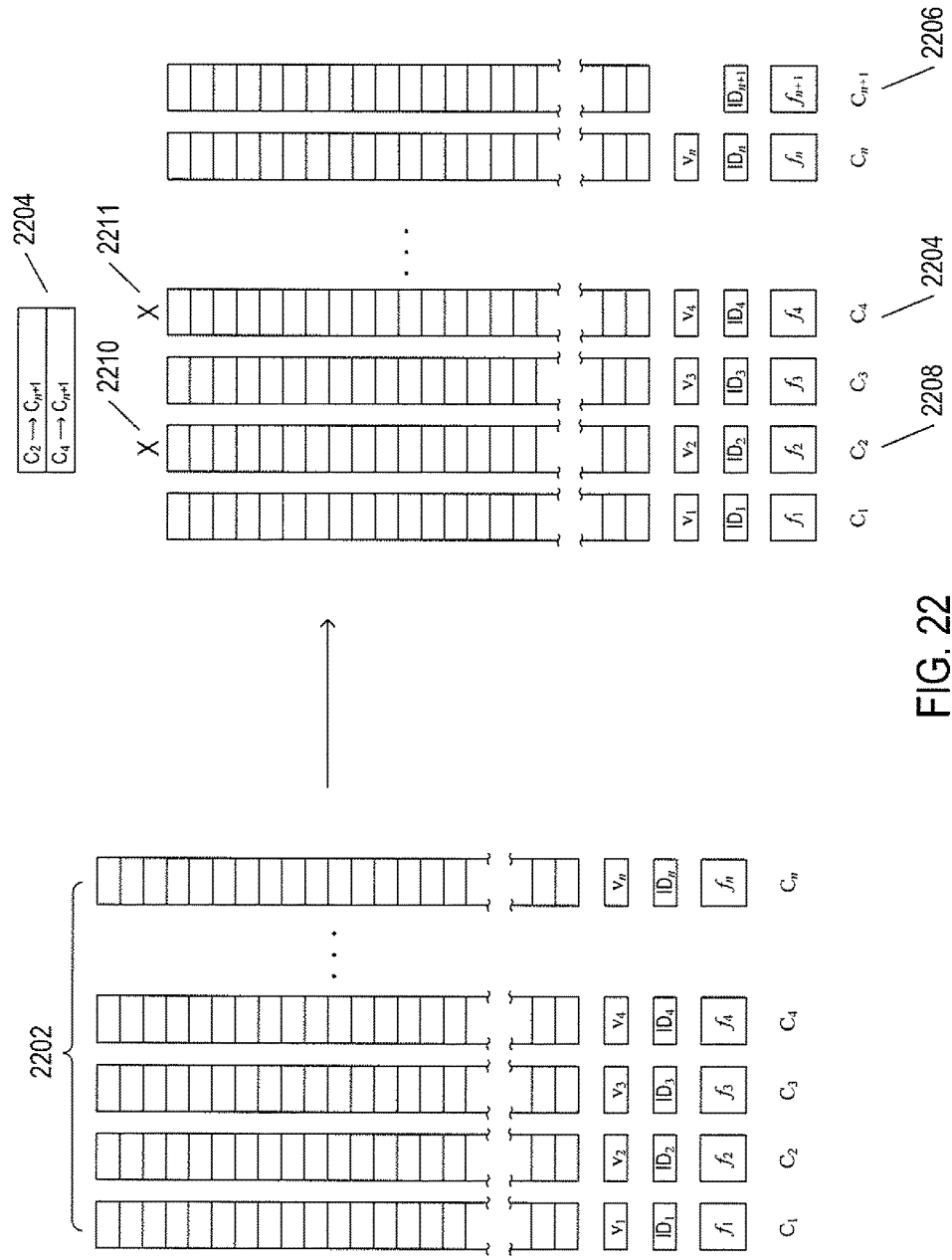
FIG. 22 illustrates a cluster-merge operation.

FIG. 22 illustrates a cluster-merge operation. The left portion of FIG. 22 shows n existing clusters 2202 within the event-message-clustering system. A downstream component requests that clusters $C_2$ and $C_4$ be merged together. As a result, the event-message-clustering system creates two rules 2204 that indicate that event messages initially typed to belong to $C_2$ and $C_4$ now belong to a new cluster $C_{n+1}$. The new cluster 2206 is created to store subsequently received event messages that were previously typed as belonging to clusters $C_2$ and $C_4$ and clusters $C_2$ and $C_4$ 2208-2209 are marked 2210 and 2211, respectively, to indicate that they will no longer be receiving event records and that, after a period of time, may be removed or returned to a pool for reallocation.

Figure 23:
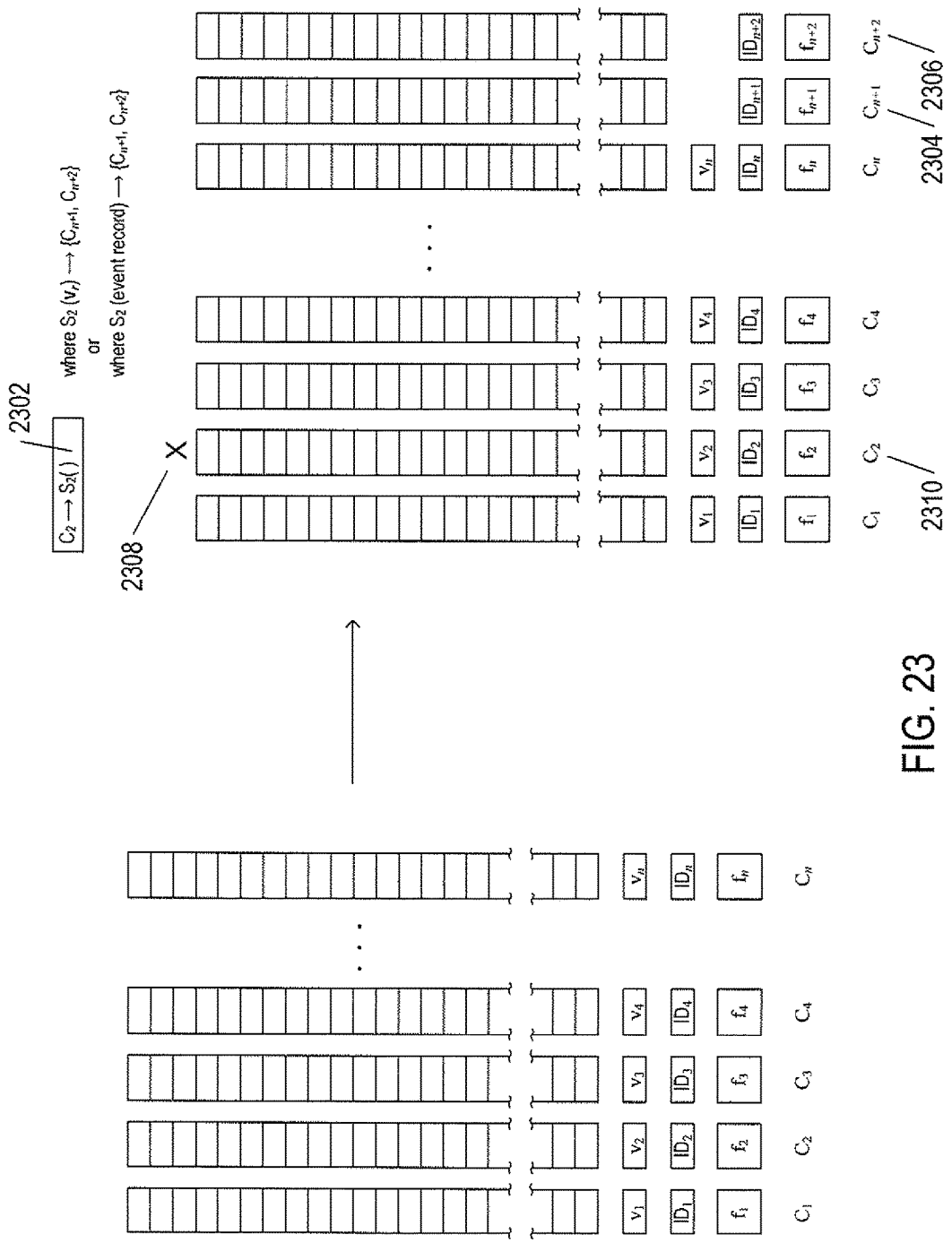
FIG. 23 illustrates a cluster-split operation.

FIG. 23 illustrates a cluster-split operation. In an example shown in FIG. 23, a downstream component requests that a cluster $C_2$ be split into two new clusters. The downstream component additionally provides a function $S_2(\ )$ that takes either a feature vector $v_r$ or an event record, as an argument, and returns an indication of which of two or more clusters to assign an event record. In response to the split request, an event-message-processing system adds a split rule 2302 to a set of stored rules that indicates that an event message assigned to cluster $C_2$ should now be assigned to the cluster returned by a call to the function $S_2(\ )$, where the function $S_2(\ )$ returns either $C_{n+1}$ or $C_{n+2}$. In addition, the event-message-clustering system creates the two new clusters $C_{n+1}$ and $C_{n+2}$ 2304 and 2306. Finally, the event-message-clustering system marks 2308 cluster $C_2$ 2310 as no longer receiving event records and as a candidate for removal or reallocation after some period of time. Note that, in the implementation described in FIGS. 22 and 23, new clusters created as a result of merge and split operations are not associated with feature vectors, since event records are directed to these clusters in two steps, the last of which involves applying a redirection rule, such as the redirection rules 2204 and 2302. In alternative implementations, rather than using CRC functions for computing feature vectors, similarity-preserving hash functions may instead be used, as a result of which distances computed as the magnitude of displacement computations on feature vectors may correspond to the degree of dissimilarity between event messages represented by the feature vectors. In this case, the event-message-clustering system may be able to use adjustable thresholding and newly computed feature vectors associated with merge and split clusters in order to direct event messages to appropriate clusters based on the computed feature vectors as in the logic 2102 discussed above with FIG. 21.

Figure 24:
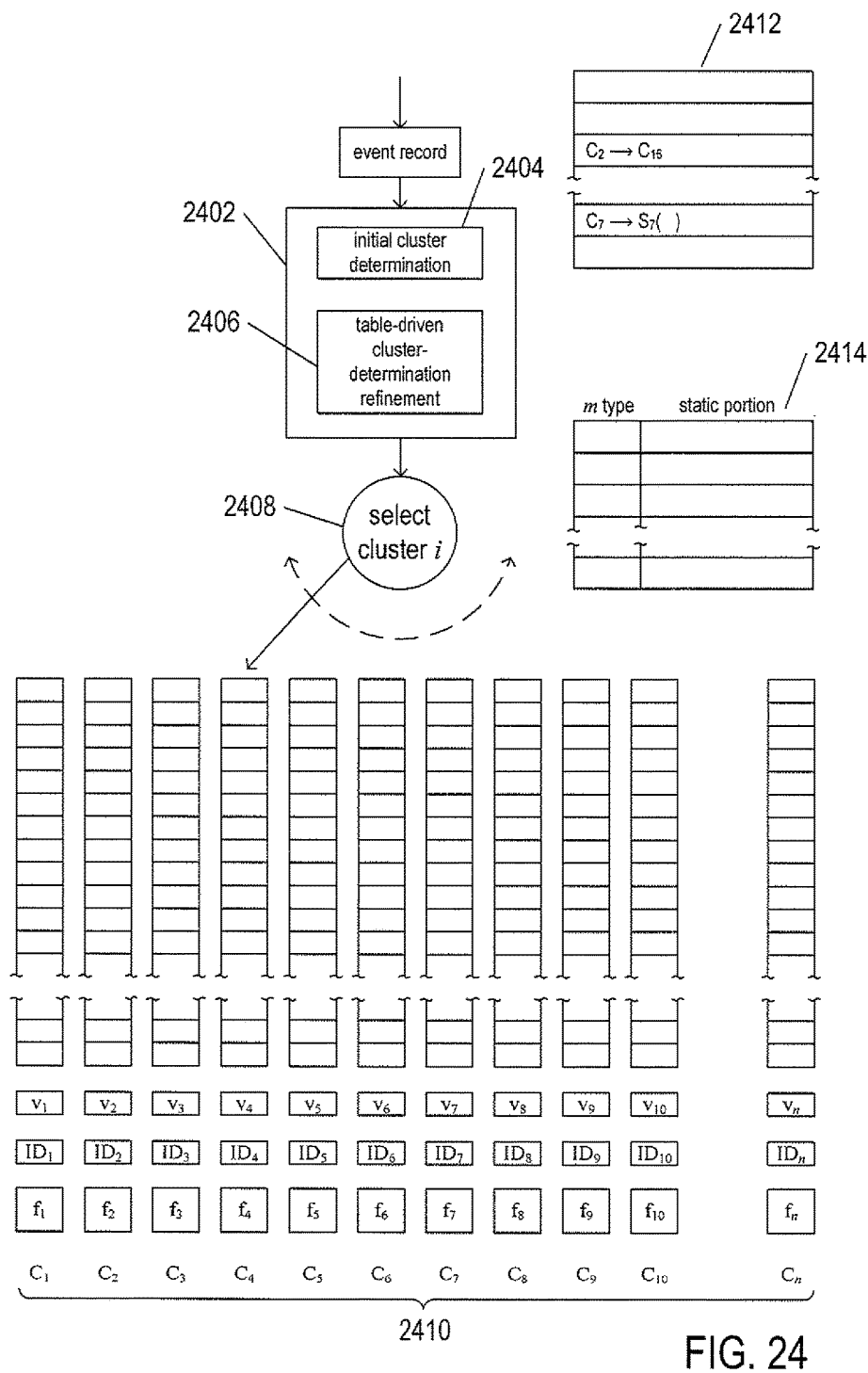
FIG. 24 provides a final illustration of one implementation of the event-message-clustering system to which the current document is directed.

FIG. 24 provides a final illustration of one implementation of the event-message-clustering system to which the current document is directed. FIG. 24 uses similar illustration conventions as used in FIGS. 21 and 14A. The event-message-clustering system includes event-message-processing logic 2402 which includes initial cluster determination logic 2104 and table-driven cluster-determination refinement logic 2406. The initial cluster determination logic 2404 normalizes an input event message, computes a feature vector from the non-parameter tokens within the normalized event message, and uses the feature vector to identify a cluster to which to assign the event message. The table-driven cluster-determination-refinement logic 2406 applies redirection rules in a table of redirection rules in order to carry out any specified redirection of the initial cluster determination that results from previous merge and split operations, as discussed above with reference to FIGS. 22 and 23. The distributor subcomponent 2408 and clusters 2410 are similar to those described with reference to FIG. 21. The event-message-clustering system additionally includes a table of redirection rules 2412 and a table of static portions for each message type 2414 that allow the event-message-clustering system to regenerate original event messages from event records should the original event messages be needed. The table of redirection rules 2412 includes at most one entry for each cluster identifier. A particular cluster may be associated with a single redirection rule or may not be associated with a redirection rule. As discussed above, the redirection rules either indicate to which cluster an event message initially designated as belonging to a first cluster should be forwarded or includes a rule that uses a function to determine to which cluster to forward an event message initially determined to belong to a cluster that was subsequently split. When a redirection rule is applied to a first cluster indication to generate a second cluster identification, the redirection-rule table is again accessed to determine whether there is another redirection rule that may be applied to the second cluster identification. In other words, redirection rules are iteratively applied until a cluster indication is obtained for which there is no redirection rule in the redirection-rule table.

Figure 25:
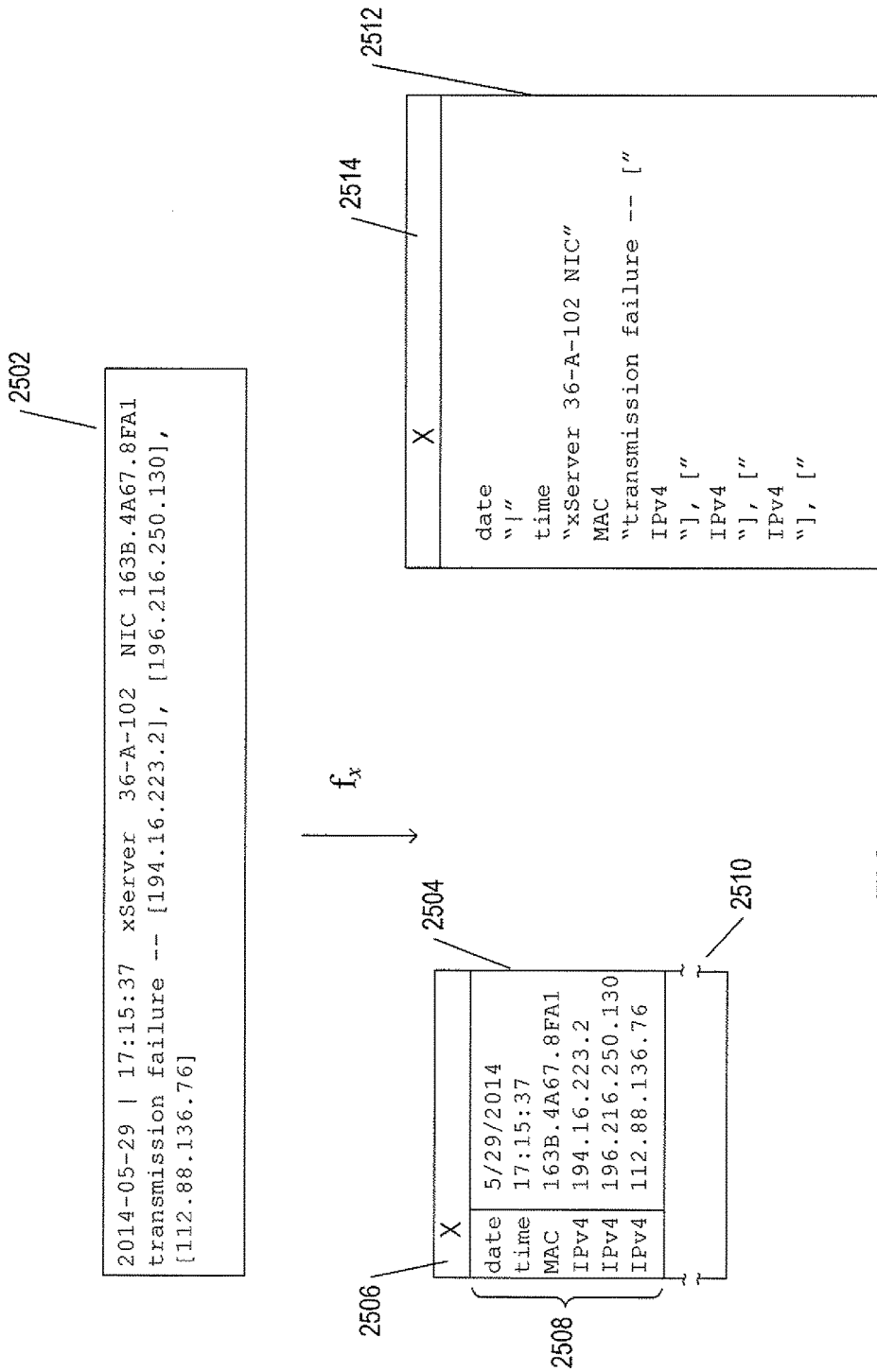
FIG. 25 illustrates a process that extracts parameter values from an event message.

FIG. 25 illustrates a process that extracts parameter values from an event message. As discussed above, each cluster is associated with a parsing function that allows the event-message-clustering system to extract parameter values from the event message. In the example shown in FIG. 25, the function $f_x$ associated with a cluster corresponding to event-message type x, when applied to a received event message of type x 2502, returns an ordered list of parameter values extracted from the message. The sorted list of parameter values can be assembled into an event record 2504 that describes the received event message. The event record may include a header with an indication of the event type 2506, a list of parameter values and associated parameter types 2508, and any additional information 2510 that an event-message-clustering system may choose to associate with event records, including details with regard to from where the event message was received. A representation of the static, non-parameter portion of the message 2512 along with an indication of the message type 2514 may be stored in the static-portion table (2414 in FIG. 24) to allow the original message 2502 to be reconstituted from the event record 2504 generated from the original event message.

Figure 26C:
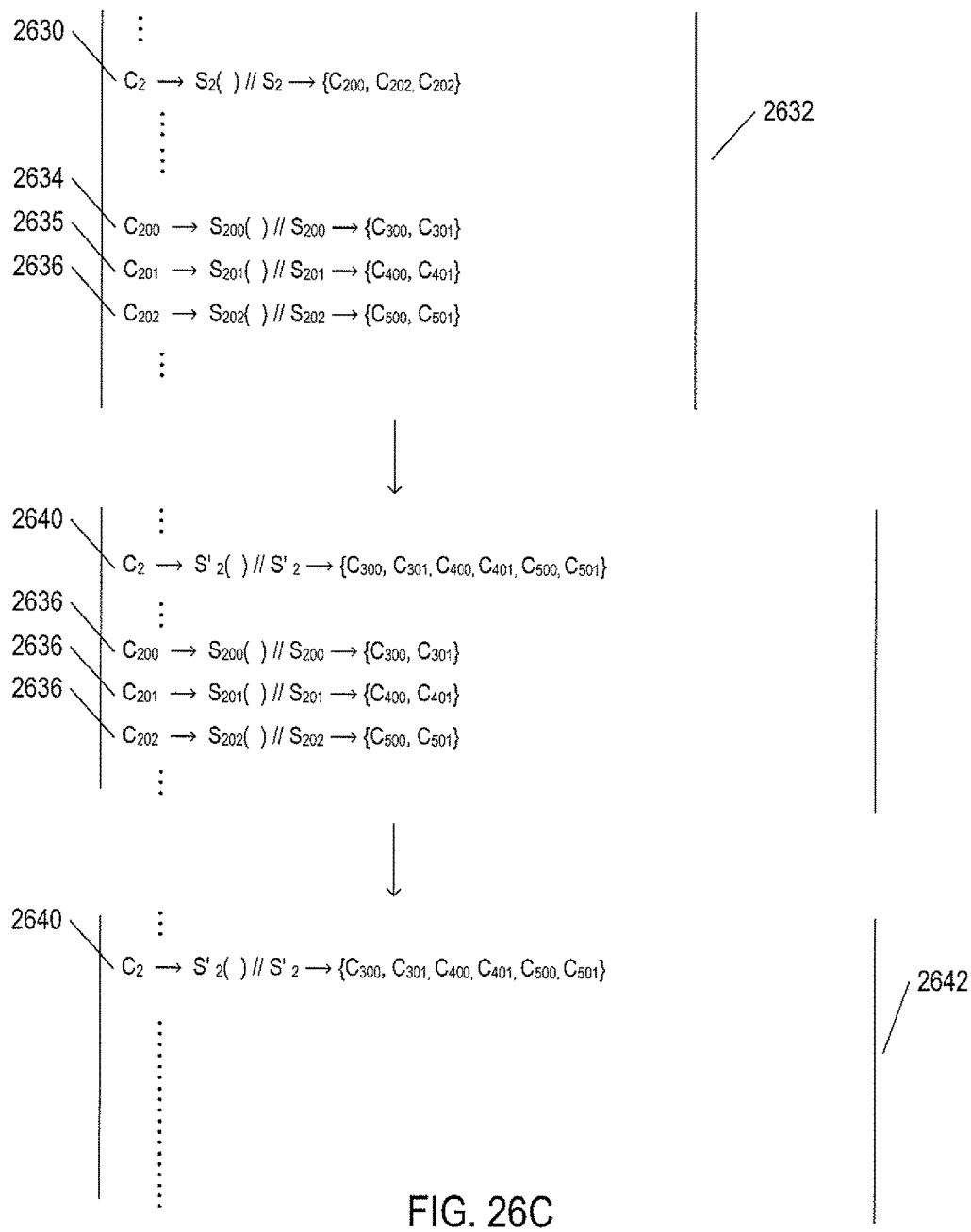

The redirection rules stored by the event-message-clustering system may be periodically analyzed in order to remove and archive unneeded redirection rules. In addition, this analysis may recognize situations in which some number of redirection rules can be replaced, often along with readjustments in the set of clusters managed by the event-message-clustering system. FIGS. 26A-C illustrate examples of editing of the redirection-rule table. In FIG. 26A, the redirection-rule table includes two merge redirection rules 2602 and 2604 and a subsequently added split redirection rule 2606. As it turns out, the split redirection rule 2606 essentially reverses the merge operation represented by the two merge redirection rules 2602 and 2604. In this case, the clusters $C_2$ and $C_{51}$ can be re-established and the two merge redirection rules 2602 and 2604 removed, temporarily leaving the split rule 2606 to allow event messages that were typed as belonging to cluster $C_{100}$ to be retyped during subsequent processing, as shown in the intermediate redirection-rule table 2610. Ultimately, once all event records typed as belonging to cluster $C_{100}$ have been flushed or archived, the split rule 2606 can be removed to completely restore the redirection table with respect to clusters $C_2$ and $C_{51}$ 2612.

FIG. 26B shows another example of redirection-rule-table editing. In this example, cluster $C_2$ was split, as a result of which the split rule 2620 was added to the redirection-rule table. Subsequently, merge rules 2622 that reverse the split operation were added to the redirection-rule table. In this case, the split rule 2620 can be removed and the original cluster $C_2$ re-established, producing an intermediary redirection-rule table 2624. Once all the event records typed as belonging to events $C_{100}$, $C_{101}$, $C_{102}$, and $C_{200}$ have been removed and archived from the event-message-clustering system, the merge rules and redirection rule can be removed to restore the redirection-rule table to its initial condition with respect to cluster $C_2$ 2626.

FIG. 26C shows yet an additional example of redirection-rule table editing. In this example, the cluster $C_2$ was split three ways, resulting in the addition of redirection rule 2630 to the redirection-rule table 2632. Subsequently, each of the new clusters created as a result of the split operation were again split, resulting in the addition of split redirection rules 2634-2636. This set of split redirection rules can be modified by creating a comprehensive split rule 2640 to directly split cluster $C_2$ into the six clusters $C_{300}$, $C_{301}$, $C_{400}$, $C_{401}$, $C_{500}$, and $C_{501}$. The three split redirection rules 2634, 2635, and 2636 are maintained until all event records typed as belonging to clusters $C_{200}$, $C_{201}$, and $C_{202}$ are removed and archived. Then, they can be removed leaving only the comprehensive split redirection rule 2640 in the redirection-rule table 2642. FIGS. 26A-C illustrate a few simple examples of redirection-rule-table editing and associated cluster reorganization. There are many additional, more complex examples in which chains and cycles of redirection rules can be removed from the redirection table. In addition, clusters can be periodically re-indexed in order to compress the range of active cluster indexes.

Figure 27A:
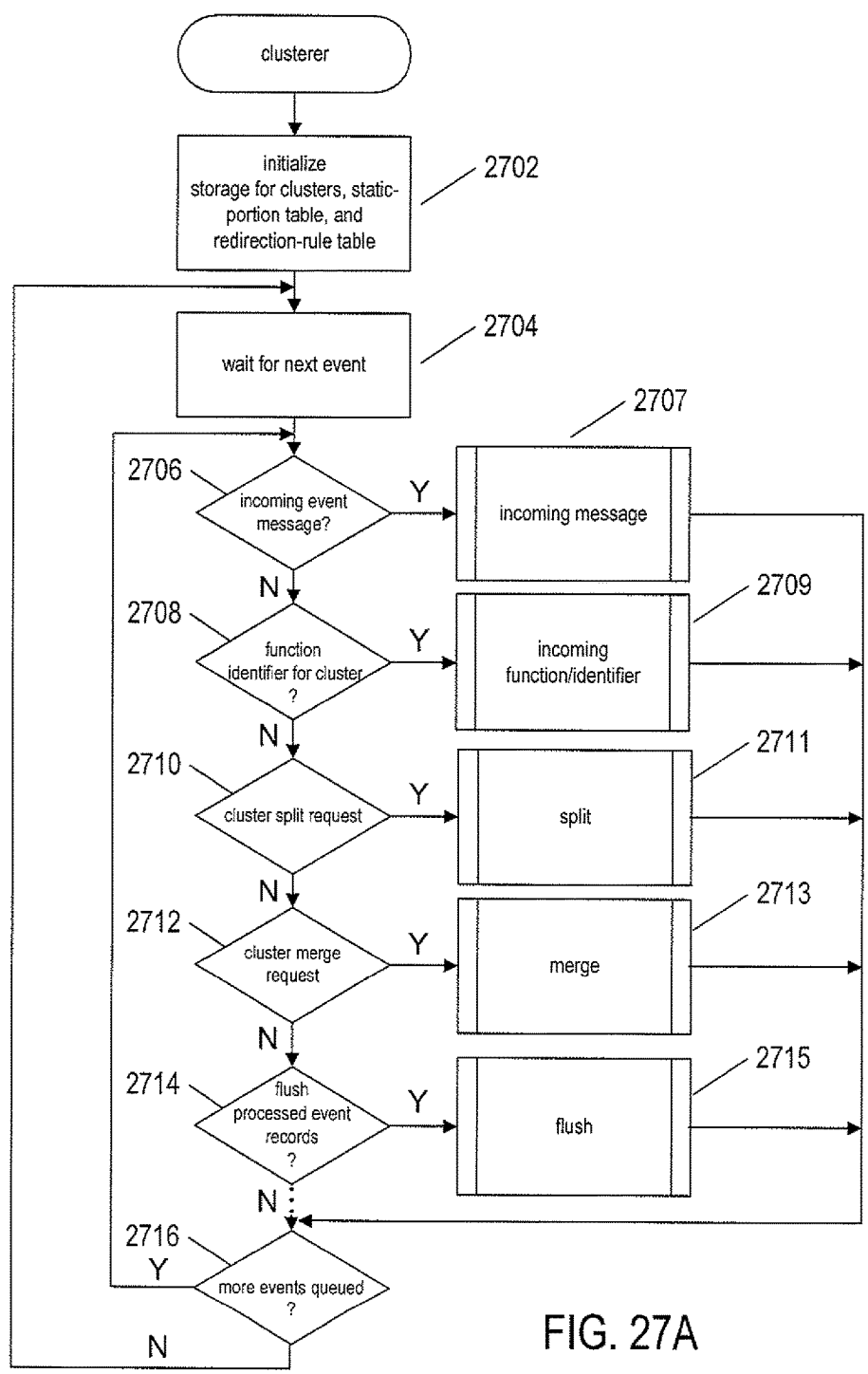
FIGS. 27A-G provide control-flow diagrams that illustrate one implementation of the event-message-clustering system and methods used within the event-message-clustering system to which the current document is directed.

FIGS. 27A-G provide control-flow diagrams that illustrate one implementation of the event-message-clustering system and methods used within the event-message-clustering system to which the current document is directed. FIG. 27A shows an event loop that continuously executes within the event-message-clustering system to process event-message-related events. In step 2702, the event-message-clustering system initializes storage for clusters, the static-portion table, and the redirection-rule table discussed above with reference to FIG. 24. Then, in step 2704, the event-message-clustering system waits for a next event to occur. When the next event occurs, the type of event is determined in a series of conditional steps 2706, 2708, 2710, 2712, and 2714. Once the event is handled, then, in step 2716, the event handler determines whether or not there are more events queued for handling. If so, control returns to step 2706; otherwise, control returns to step 2704. When the next-occurring event represents receipt of a next incoming event message, as determined in step 2706, the routine "incoming message" is called in step 2707. When the next-occurring event is receipt of a function and identifier for a cluster, as determined in step 2708, the routine "incoming function/identifier" is called in step 2709. When the next-occurring event is a cluster-split request, as determined in step 2710, the routine "split" is called in step 2711. When the next-occurring event is a cluster merge request, as determined in step 2712, the routine "merge" is called in step 2713. When the next-occurring event is a request to flush processed event records, as determined in step 2714, the routine "flush" is called in step 2715.

In general, the event-message-clustering system continuously executes and handles any events related to event messages that occur within a distributed computing system. As indicated by ellipses in FIG. 27A, there are many additional types of events that may occur. Calls to handlers that handle certain of the fully-automated clustering-related events that may occur are shown in FIG. 27A, The handlers are described below with reference to FIGS. 27B-G. However, may other events may occur and may be handled by various implementations of the event-message-clustering system. As one example, certain implementations support interaction with system administrators and other users. In these implementations, an interface provided by the event-message-clustering system on a system-administration computer or on remote systems allows system administrators and other authorized users to view event logs, edit event logs, archive event logs, monitor incoming event records in real time, and to issue commands to the event-message-clustering system. These commands include, in certain implementations, commands that direct the event-message-clustering system to merge two or more clusters into a single cluster, split a particular cluster into multiple clusters, add a new cluster, the new cluster defined by a feature vector, cluster identifier, and parsing function provided by the user, remove an existing cluster, and modify an existing cluster. In addition, in certain implementations, a user can identify types of classes of event messages that should be ignored and not processed and logged by the event-message-clustering system. In these systems, initial clustering may be driven largely by manual input from a system administrator and may, in fact, be manually driven over the entire course of event-record logging. For example, a manual configuration may direct event messages to a single cluster, initially, after inspection of the contents of which a system administrator my direct split operations and add additional clusters through the administration interface. Alternatively, a system administrator may manually specify initial clusters and monitor event-record logging for a sufficient time to ensure that the automated clustering has a useful and accurate set of initial clusters, after which automated clustering may increasingly assume responsibility for cluster management and event logging.

Figure 27B:
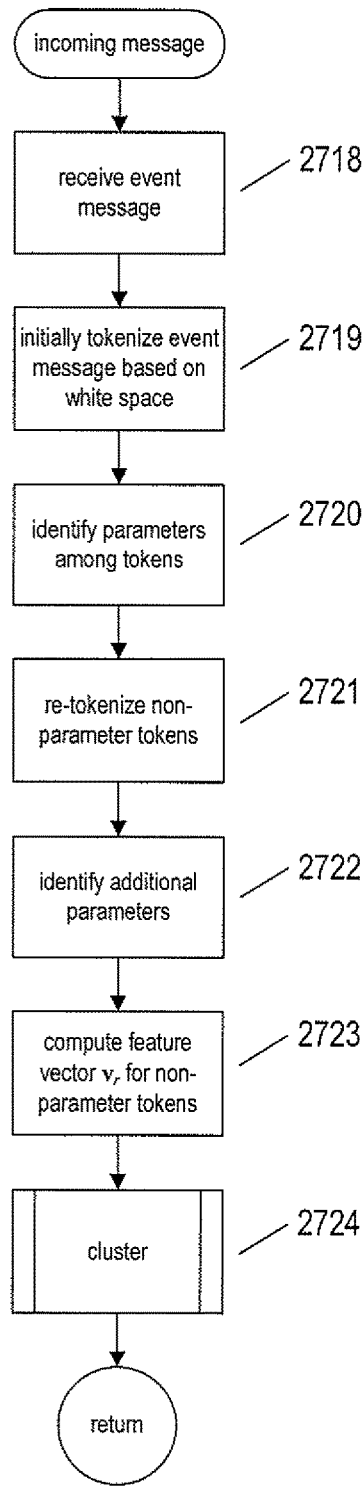

FIG. 27B provides a control-flow diagram for the routine "incoming message" called in step 2707 of FIG. 27A. In step 2718, the incoming event message is received. In step 2719, the event message is initially tokenized based on non-printing characters, as discussed above with reference to FIG. 15. In step 2720, a first pass of parameter identification is carried out on the tokens produced in step 2719. In step 2721, the non-parameter tokens may be retokenized to remove punctuation and characters used for separation purposes as well as to remove such characters from the leading and trailing extremities of non-parameter tokens. In step 2722, a second pass of parameter identification is carried out in order to attempt to identify additional parameter values among the non-parameter tokens. In step 2723, a feature vector $v_r$ is computed based on the remaining non-parameter tokens. Computation of feature vectors is discussed with reference to FIGS. 16-18, above. Finally, in step 2724, the routine "cluster" is called.

Figure 27C:
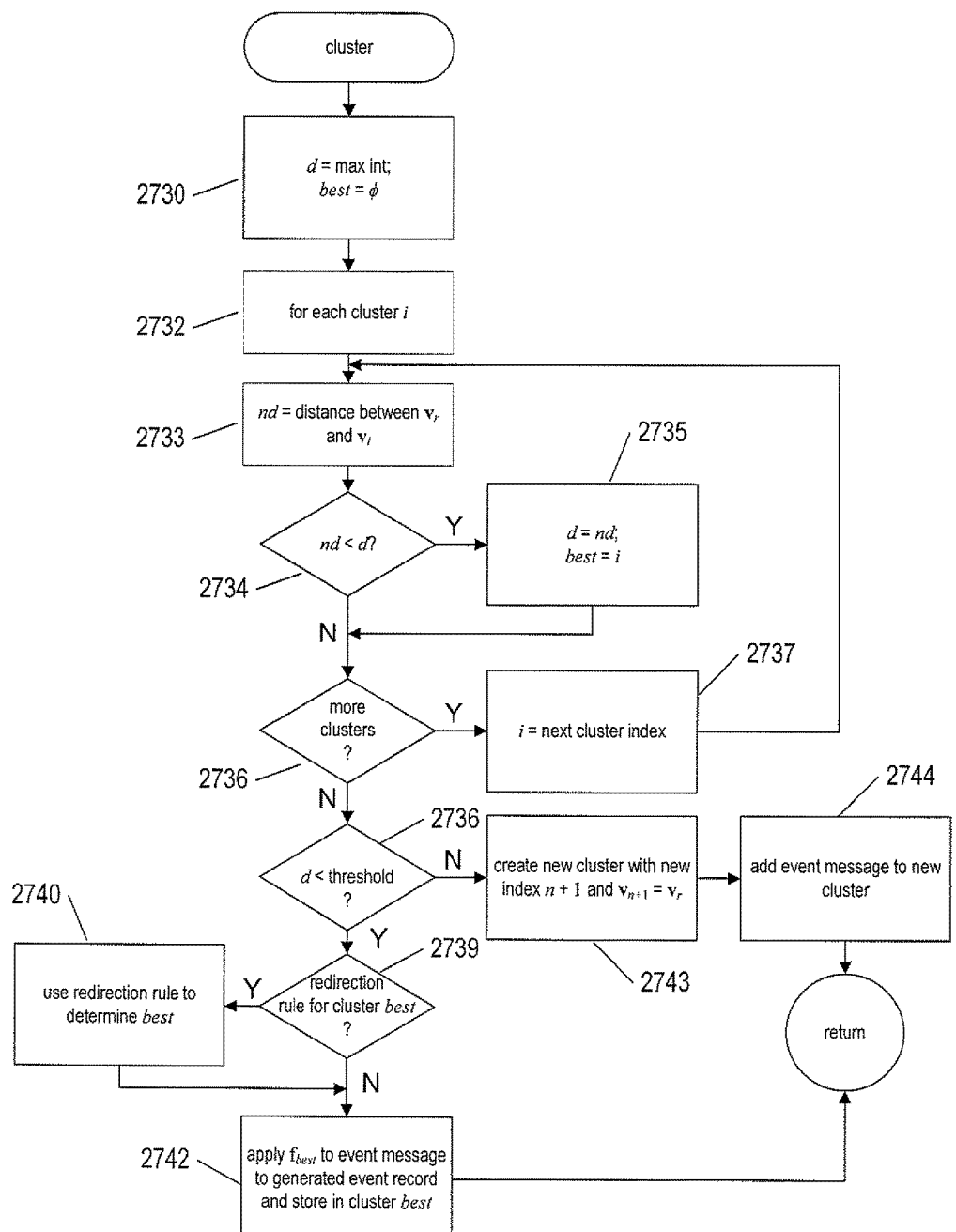

FIG. 27C provides a control-flow diagram for the routine "cluster" called in step 2724 of FIG. 27B. In step 2730, local variables d and best are set to a large number and to null, respectively. Then, in the for-loop of steps 2732-2737, each currently existing cluster identified by cluster index i is considered. In step 2733, the local variable nd is set to the computed distance between the event message represented by the feature vector $v_r$ and the feature vector $v_i$ associated with the currently considered cluster i. When nd is less than d, as determined in step 2734, the currently considered cluster is the best candidate cluster to which to assign the recently received event message. In this case, d is set to nd and best is set to 1, in step 2735, in order to store the fact that a new best candidate cluster has been found. When there are more clusters to consider, as determined in step 2736, index i is set to the next cluster index in step 2737 and control returns to the top of the for-loop, in step 2733. When the value stored in local variable d is less than a threshold value, as determined in step 2738, then the redirection-rule table is checked to see if there is a redirection rule for the cluster identified by the contents of local variable best. When there is a redirection rule for this cluster, as determined in step 2739, then the redirection rule is used to determine a final value for best, the index of the cluster to which to assign the recently received event message, in step 2740. As stated above, whenever a redirection rule is applied to generate a new value for best, the redirection-rule table needs to again be accessed in order to determine whether there is a redirection rule for the cluster referenced by the new value of best and, when there is a redirection rule for the cluster referenced by the new value of best, the process continues until best references a cluster for which there is no redirection rule. In step 2742, the parsing function associated with the cluster identified by the contents of local variable best is used to process the recently received event message to generate an event record and the event record is then in the cluster identified by the contents of the local variable best, in step 2742. When d is not less than a threshold value, as determined in step 2738, then a new cluster is created and the feature vector $v_r$ computed for the recently received event message is associated with the new cluster, in step 2743. In step 2744, the recently received event message is added to the new cluster.

Figure 27D:
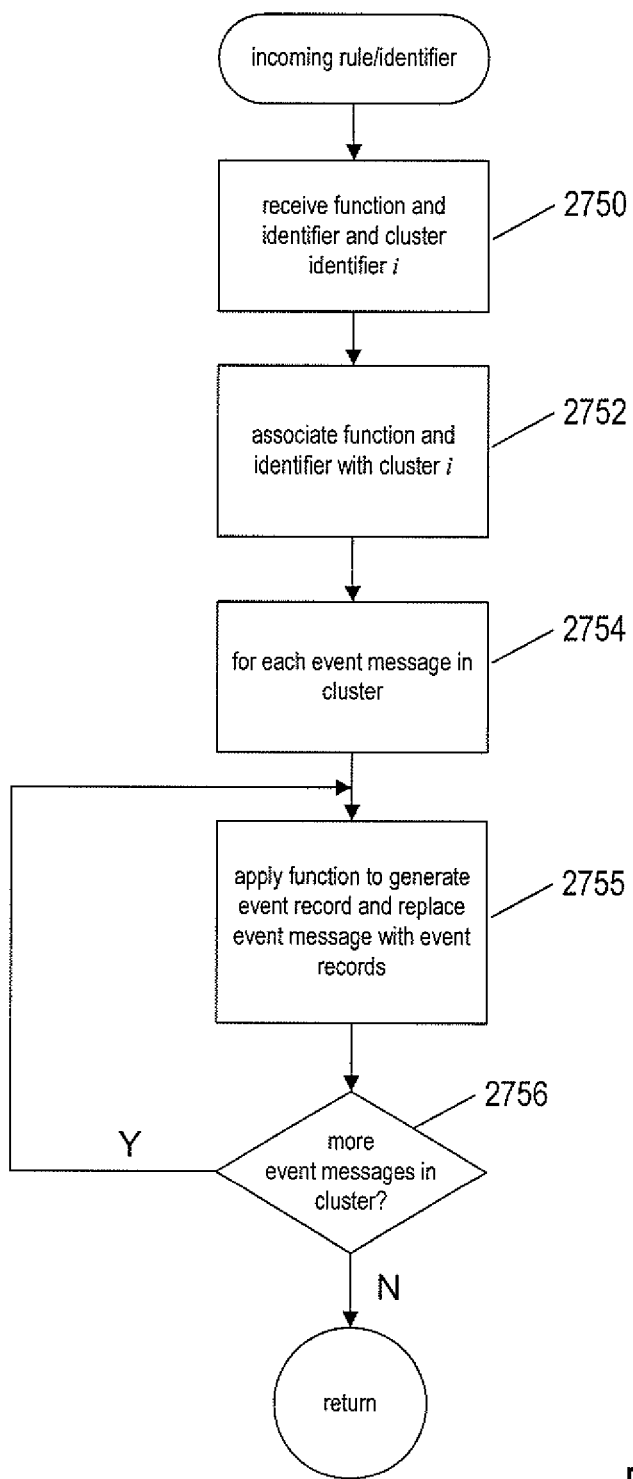

FIG. 27D provides a control-flow diagram for the routine "incoming rule/identifier," called in step 2709 of FIG. 27A. In step 2750, the routine receives a parsing function and cluster identifier from a downstream event-message-analyzing component as well as a second identifier i that can be used to identify the cluster for which the new identifier and parsing function is provided. In step 2752, the routine associates the parsing function and new identifier with the cluster i. Then, in the for-loop of steps 2754-2756, the routine "incoming rule/identifier" applies the new function to the event messages associated with the cluster to transform the event messages into event records.

Figure 27E:
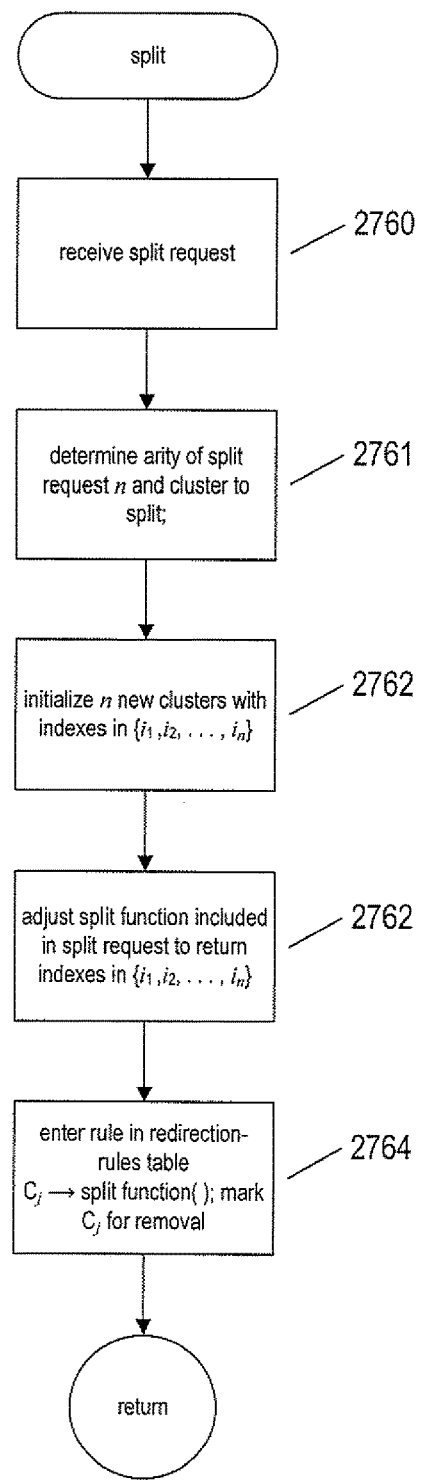

FIG. 27E provides a control-flow diagram for the routine "split," called in step 2711 in FIG. 27A. In step 2760, the routine "split" receives a split request from a downstream event-message-analysis system. In step 2761, the routine "split" determines the arity of the split request, n, and the cluster to be split from the split request. In step 2762, the routine "split" initializes n new clusters with a set of corresponding cluster indices. In step 2763, the routine "split" adjusts the split function included in the split request to return indexes for the newly created clusters in step 2763. Finally, in step 2764, the routine "split" enters a redirection rule in the redirection-rules table and marks the cluster being split for subsequent removal.

Figure 27F:
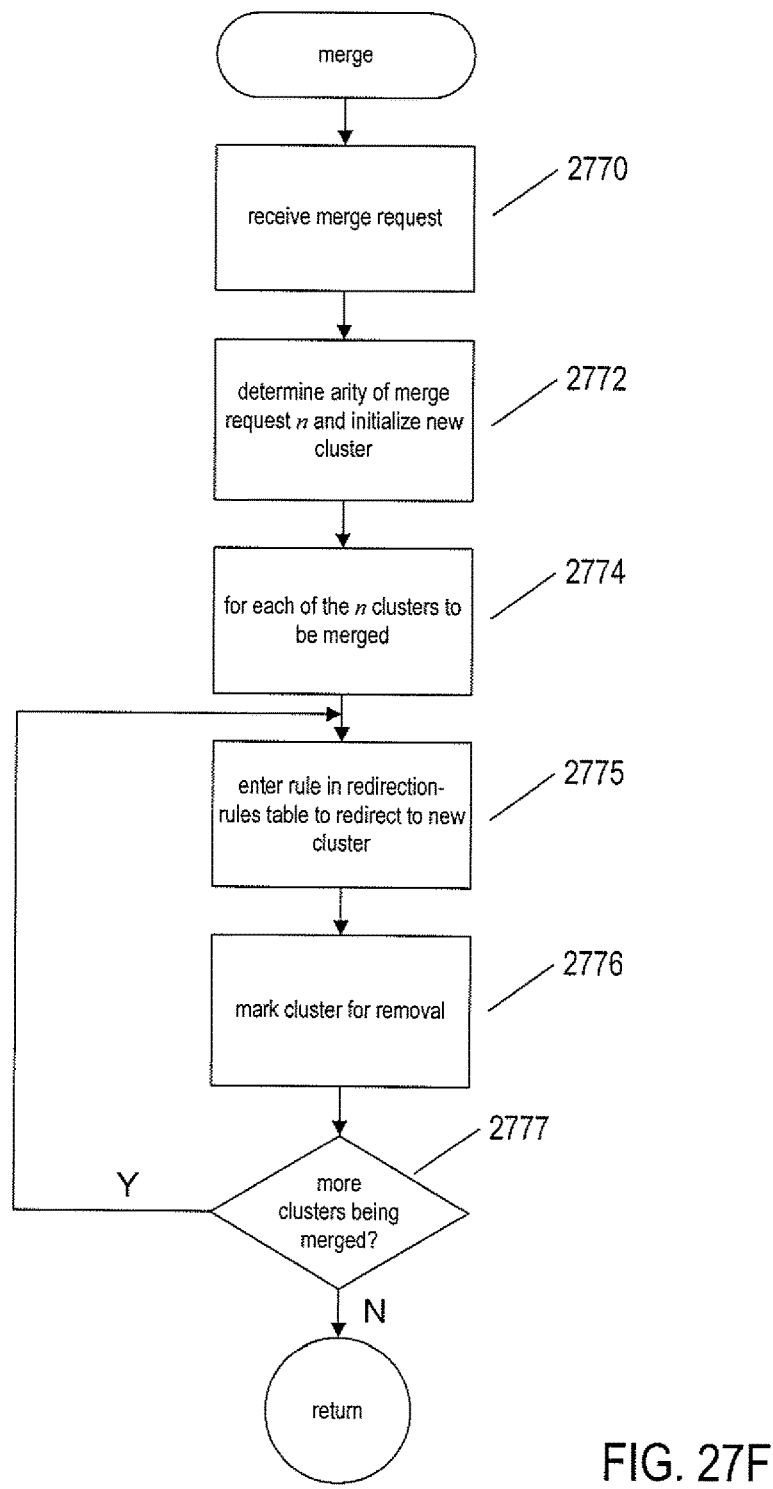

FIG. 27F provides a control-flow diagram for the routine "merge." In step 2770, the routine "merge" receives a merge request. In step 2772, the routine "merge" determines the arity of the merge request, n, and initializes a new cluster to receive event messages that would have otherwise gone to the clusters being merged. Then, in the for-loop of steps 2774-2777, the routine "merge" enters a merge redirection rule in the redirection-rules table to direct event messages that would have been directed to the clusters being merged to the new cluster. The currently considered cluster that is being merged is marked for removal in step 2776. For both merge and split operations, various types of error checking are carried out to ensure that inconsistent redirection rules are not added to the redirection-rule table. For example, when a cluster is already associated with a redirection rule, a split or merge operation directed to the cluster is considered to be an error, in many implementations.

Figure 27G:
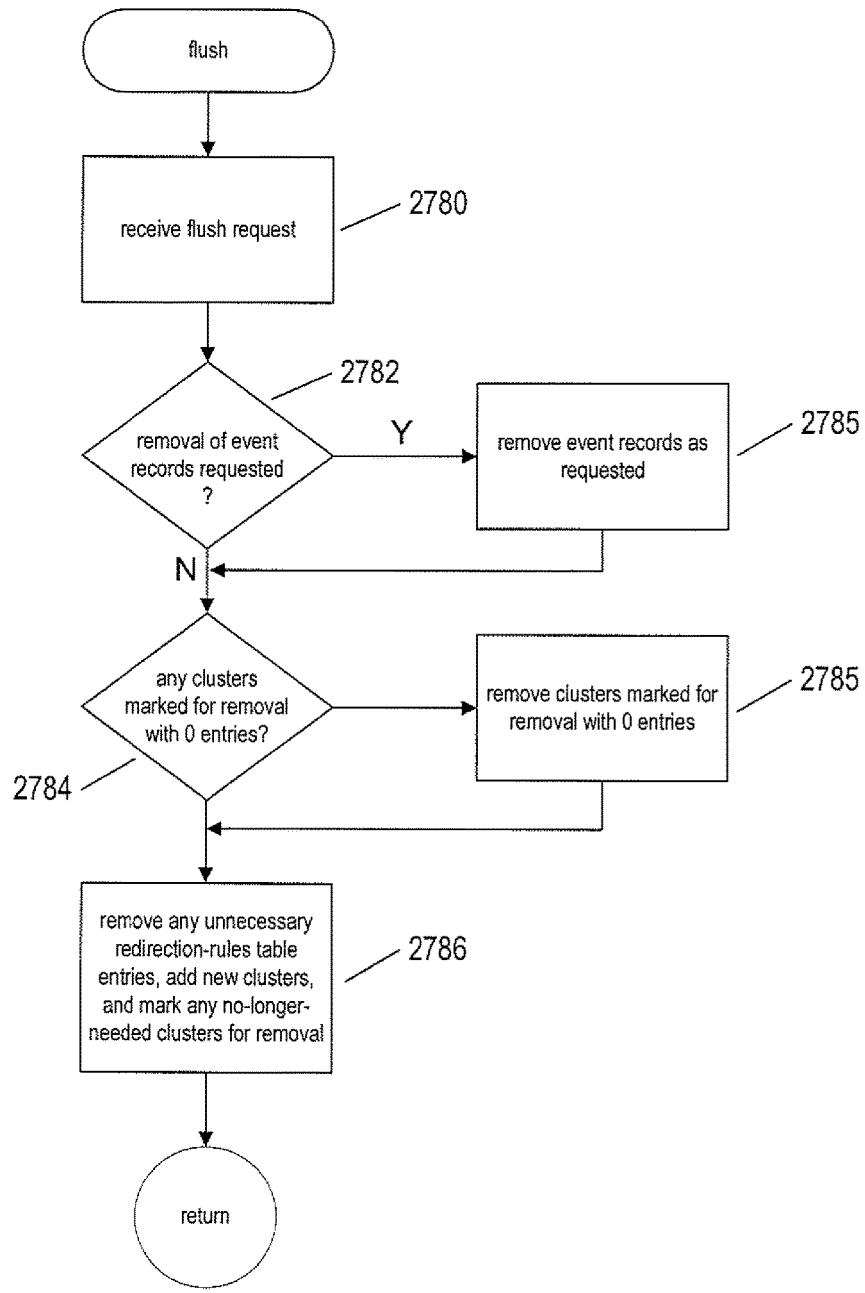

FIG. 27G provides a control-flow diagram for the routine "flush" called in step 2715 of FIG. 27A. In step 2780, the routine "flush" receives a flush request. When the flush request includes a request to remove event records, as determined in step 2782, then, in step 2783, the routine "flush" removes the event records from clusters as requested, in certain implementations archiving the removed event records or transferring the removed event records to another entity. Following event-record removal, the routine "flush" determines whether any clusters marked for removal now have no entries, in step 2784. When there are clusters marked for removal with no entries, those clusters are removed and potentially returned to a cluster pool for reallocation in step 2785. Finally, in step 2786, the redirection rule table is analyzed to remove unnecessary redirection rules, potentially adding new clusters and marking no longer needed clusters for removal as discussed above with reference to FIGS. 27A-C. The routine "flush" may be periodically called by a flush-timer expiration.

Although the present invention has been described in terms of particular embodiments, it is not intended that the invention be limited to these embodiments. Modifications within the spirit of the invention will be apparent to those skilled in the art. For example, any of a variety of different implementations of the event-message-clustering system can be obtained by varying any of many different design and implementation parameters, including modular organization, programming language, underlying operating system, control structures, data structures, and other such design and implementation parameters. As discussed above, the metric m computed in order to determine the type of event message that has been received by the system may vary with different implementations. In the currently described implementations, this metric has a feature vector but in alternative implementations, other types of metrics may be computed. In the methods used to determine the distance between two event message represented by feature vectors may also vary with different implementations. The particular normalization procedures may vary with different implementations, including use of various different types of rules and approaches for identifying parameter values within event messages. As one example, limited word-association-based methods may be potentially used in order to differentiate numeric parameter values from numeric indications of event types.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An event-message clustering system comprising:
one or more processors;
one or more memories; and
computer instructions, stored in one or more of the one or more memories that, when executed by one or more of the one or more processors, control the event-message clustering system to
receive event messages; and
process each of the received event messages by
normalizing the event message to identify parameter tokens within the event message,
computing, using non-parameter tokens within the event message, a metric to represent the event message by
identifying white-space-separated tokens within the event message
applying one or more regular expressions or routines to the identified white-space-separated tokens to identify tokens that are information encodings likely to vary within event-messages of a type of event messages to which the event message belongs, and
applying a set of functions to the identified non-parameter tokens to generate a feature vector,
using the metric to select an event-message cluster to which to assign the event message,
generating an event record using an identifier for the selected cluster and the parameter tokens, and
storing the event record within, or associated with, the selected cluster in a physical data-storage device.

2. The event-message clustering system of claim 1, wherein information encodings likely to vary within event-messages of a type of event messages to which the event message belongs include strings of characters that represent: MAC addresses; dates; times; network addresses; GUIDs; HTTP statuses; and URLs.

3. The event-message clustering system of claim 1, wherein normalizing the event message to identify parameter tokens within the event message further includes: following identifying white-space-separated tokens within the event message and using one or more regular expressions or routines to identify tokens that are information encodings likely to vary within event-messages of a type of event messages to which the event message belongs, retokenizing the white-space-separated tokens not identified as parameter tokens to remove punctuation and separation symbols from the leading and trailing portions of the identified white-space-separated tokens; and using one or more regular expressions or token-recognizing routines to identify those retokenized tokens that are information encodings likely to vary within event-messages of a type of event messages to which the event message belongs.

4. The event-message clustering system of claim 1 wherein computing, using non-parameter tokens within the event message, a metric to represent the event message further includes: considering the non-parameter tokens within the event message as an ordered set of n non-parameter tokens, where n is the number of non-parameter tokens; applying each of a set of m functions that each accepts n tokens to the ordered set of n non-parameter tokens to produce m return values; and assembling the m return values into an m-dimensional feature vector.

5. The event-message clustering system of claim 4 wherein each of the m functions computes, for each of the n tokens in the ordered set of n non-parameter tokens, the product of a token-receiving function and a first constant, to which product a second constant is added to produce a result to which a modulus operation is applied to produce a final result, the function of the m functions returning, as a return value, a selected one of the final results computed for each of the n tokens.

6. The event-message clustering system of claim 5 wherein the token-receiving function is one of: a cyclic-redundancy-check function; and a similarity-preserving hash function.

7. The event-message clustering system of claim 4 wherein each cluster is associated with a feature vector; and wherein using the metric to select an event-message cluster to which to assign the event message further comprises for each cluster, computing a distance metric using the feature vector computed for the event message and the feature vector associated with the cluster, and selecting as a candidate cluster a cluster for which the computed distance metric has a smallest value.

8. The event-message clustering system of claim 7 wherein, when the distance metric computed for the candidate cluster is less than a threshold value, selecting the candidate cluster as the cluster to which to assign the event record, and otherwise creating a new cluster, associating the feature vector computed for the event message with the new cluster, and assigning the event message to the new cluster.

9. The event-message clustering system of claim 1 wherein the event-message clustering system additionally receives requests, including cluster-merge requests, cluster-split requests, and requests to associate a parse function and identifier with a cluster.

10. The event-message clustering system of claim 9 wherein, in response to receiving a request to merge two or more clusters, the event-message clustering system creates a new merge cluster; and for each of the two-or-more clusters, stores a redirection rule in a redirection-rule table, and marks the cluster for removal.

11. The event-message clustering system of claim 9 wherein, in response to receiving a request to split a cluster into two or more clusters, the event-message clustering system creates a new split cluster for each of the two or more clusters; and stores a redirection rule in a redirection-rule table for the cluster; and marks the cluster for removal.

12. A method that assigns a type to an event message and stores an event-record corresponding to the event message, carried out within an event-message clustering system, the event-message clustering system having one or more processors, one or more memories, and computer instructions, stored in one or more of the one or more memories that, when executed by one or more of the one or more processors, control the event-message clustering system to receive event messages and process each of the received event messages, the method comprising: normalizing the event message to identify parameter tokens within the event message,
   computing, using non-parameter tokens within the event message, a metric to represent the event message by
      identifying white-space-separated tokens within the event message
      applying one or more regular expressions or routines to the identified white-space-separated tokens to identify tokens that are information encodings likely to vary within event-messages of a type of event messages to which the event message belongs, and
      applying a set of functions to the identified non-parameter tokens to generate a feature vector,
   using the metric to select an event-message cluster to which to assign the event message,
   generating an event record using an identifier for the selected cluster and the parameter tokens, and
   storing the event record within, or associated with, the selected cluster in a physical data-storage device.

13. The method of claim 12 wherein normalizing the event message to identify parameter tokens within the event message further includes: following identifying white-space-separated tokens within the event message and using one or more regular expressions or routines to identify tokens that are information encodings likely to vary within event-messages of a type of event messages to which the event message belongs, retokenizing the white-space-separated tokens not identified as parameter tokens to remove punctuation and separation symbols from the leading and trailing portions of the identified white-space-separated tokens; and using one or more regular expressions or token-recognizing routines to identify those retokenized tokens that are information encodings likely to vary within event-messages of a type of event messages to which the event message belongs.

14. The method of claim 12 wherein computing, using non-parameter tokens within the event message, a metric to represent the event message further includes: considering the non-parameter tokens within the event message as an ordered set of n non-parameter tokens, where n is the number of non-parameter tokens; applying each of a set of m functions that each accepts n tokens to the ordered set of n non-parameter tokens to produce m return values; and assembling the m return values into an m-dimensional feature vector.

15. The method of claim 14 wherein each of the m functions computes, for each of the n tokens in the ordered set of n non-parameter tokens, the product of a token-receiving function and a first constant, to which product a second constant is added to produce a result to which a modulus operation is applied to produce a final result, the function of the m functions returning, as a return value, a selected one of the final results computed for each of the n tokens.

16. The method of claim 14 wherein each cluster is associated with a feature vector; and wherein using the metric to select an event-message cluster to which to assign the event message further comprises for each cluster, computing a distance metric using the feature vector computed for the event message and the feature vector associated with the cluster, and selecting as a candidate cluster a cluster for which the computed distance metric has a smallest value.

17. Computer instructions stored within a physical device that, when executed by one or more processors of an event-message clustering system that additionally includes one or more memories, control the event-message clustering system to: receive event messages; and process each of the received event messages by
   normalizing the event message to identify parameter tokens within the event message,
      computing, using non-parameter tokens within the event message, a metric to represent the event message
         identifying white-space-separated tokens within the event message applying one or more regular expressions or routines to the identified white-space-separated tokens to identify tokens that are information encodings likely to vary within event-messages of a type of event messages to which the event message belongs, and applying a set of functions to the identified non-parameter tokens to generate a feature vector, using the metric to select an event-message cluster to which to assign the event message, generating an event record using an identifier for the selected cluster and the parameter tokens, and storing the event record within, or associated with, the selected cluster in a physical data-storage device.

* * * * *